United States Patent
Sugihara et al.

(10) Patent No.: US 10,288,888 B2
(45) Date of Patent: May 14, 2019

(54) EYEGLASS-TYPE WEARABLE DEVICE, AND FRONT PART AND TEMPLE PART OF EYEGLASS-TYPE WEARABLE DEVICE

(71) Applicant: OLYMPUS CORPORATION, Tokyo (JP)

(72) Inventors: Ryohei Sugihara, Machida (JP); Seiji Tatsuta, Hachioji (JP); Teruo Tomita, Fuchu (JP)

(73) Assignee: OLYMPUS CORPORATION, Tokyo (JP)

( * ) Notice: Subject to any disclaimer, the term of this patent is extended or adjusted under 35 U.S.C. 154(b) by 273 days.

(21) Appl. No.: 14/522,851

(22) Filed: Oct. 24, 2014

(65) Prior Publication Data

US 2015/0042544 A1 Feb. 12, 2015

Related U.S. Application Data

(63) Continuation of application No. PCT/JP2013/063925, filed on May 20, 2013.

(30) Foreign Application Priority Data

May 21, 2012 (JP) ................................. 2012-115361
May 21, 2012 (JP) ................................. 2012-115362

(51) Int. Cl.
*G02C 5/14* (2006.01)
*G02B 27/01* (2006.01)
*G02C 11/00* (2006.01)

(52) U.S. Cl.
CPC ....... *G02B 27/0176* (2013.01); *G02B 27/017* (2013.01); *G02C 11/10* (2013.01); *G02B 2027/0178* (2013.01); *G02C 5/14* (2013.01)

(58) Field of Classification Search
CPC .... G02B 27/01; G02B 27/0176; G02C 11/00; G02C 5/14; G02C 11/10
(Continued)

(56) References Cited

U.S. PATENT DOCUMENTS 6,204,974 B1 * 3/2001 Spitzer ................ G02B 27/017
359/630
6,342,872 B1 * 1/2002 Potin ...................... A42B 3/042
345/7

(Continued)

FOREIGN PATENT DOCUMENTS

CN 2826471 Y 10/2006
CN 101529899 A 9/2009
(Continued)

OTHER PUBLICATIONS

International Search Report dated Aug. 20, 2013 issued in PCT/JP2013/063925.
(Continued)

*Primary Examiner* — Ifedayo B Iluyomade
(74) *Attorney, Agent, or Firm* — Scully, Scott, Murphy & Presser, P.C.

(57) ABSTRACT

An eyeglass-type wearable device includes a first temple part that is positioned along one temporal region of a user, a second temple part that is positioned along the other temporal region of the user, and a front part that is positioned in front of the face of the user, when the eyeglass-type wearable device is worn by the user. The first temple part includes a first electrical unit, and the second temple part includes a second electrical unit. The front part includes a first connection section to which the first temple part is connected, a second connection section to which the second temple part is connected, and a connection line that electrically connects the first electrical unit of the first temple part and the second electrical unit of the second temple part when
(Continued)

the first temple part and the second temple part are connected to the front part.

9 Claims, 21 Drawing Sheets

(58) Field of Classification Search
USPC .............................................. 345/8; 351/116
See application file for complete search history.

(56) References Cited

U.S. PATENT DOCUMENTS

| | | | |
|---|---|---|---|
| 2004/0021619 A1* | 2/2004 | Kiyokawa | G02B 27/0176 345/8 |
| 2009/0002626 A1* | 1/2009 | Wakabayashi | G02C 11/06 351/116 |
| 2010/0103076 A1 | 4/2010 | Yamamoto et al. | |

FOREIGN PATENT DOCUMENTS

| | | | | |
|---|---|---|---|---|
| JP | 3052855 U | | 10/1998 | |
| JP | 2001-272628 A | | 10/2001 | |
| JP | 2001272628 A | * | 10/2001 | ............. G02B 27/02 |
| JP | 2009-237450 A | | 10/2009 | |
| JP | 2009237450 A | * | 10/2009 | |
| JP | 2010-091748 A | | 4/2010 | |
| JP | 2012-008290 A | | 1/2012 | |
| JP | 2012006368 A | * | 1/2012 | |
| JP | 2012-063638 A | | 3/2012 | |
| WO | WO 2007/099707 A1 | | 9/2007 | |

OTHER PUBLICATIONS

Chinese Office Action dated Apr. 6, 2017 in Chinese Patent Application No. 201380025117.9.

* cited by examiner

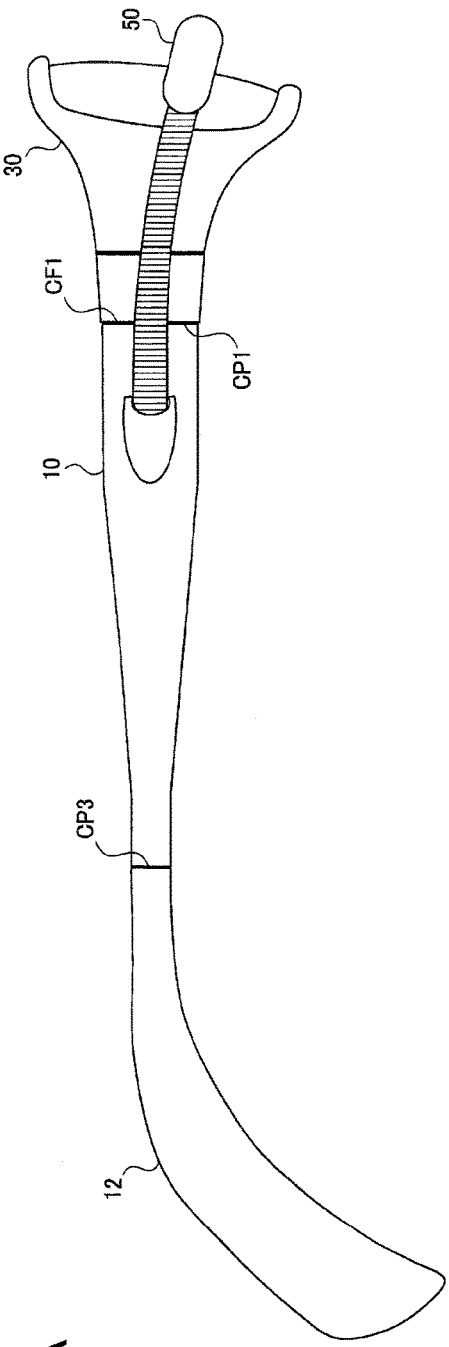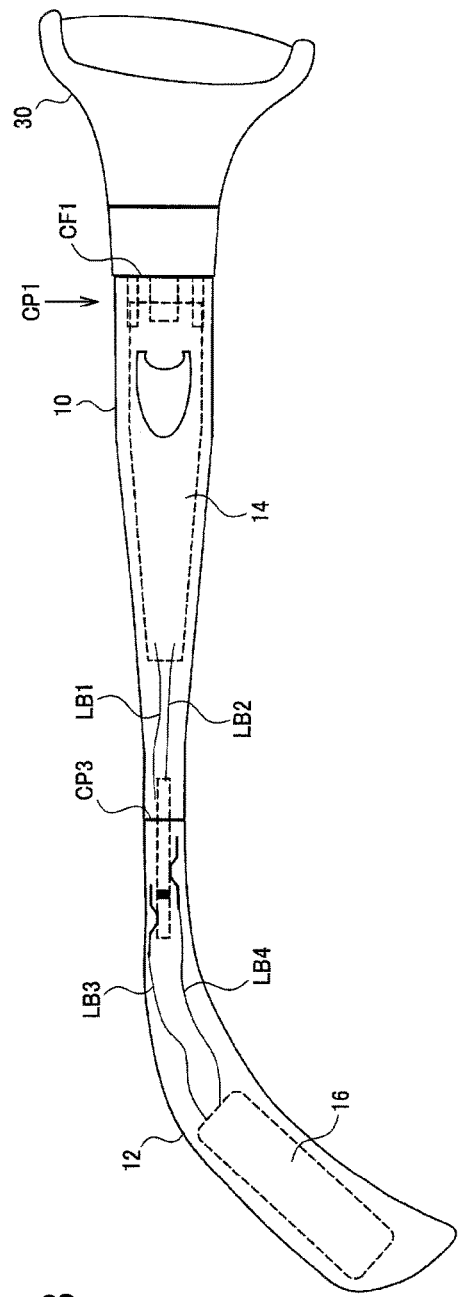
FIG. 7A
FIG. 7B

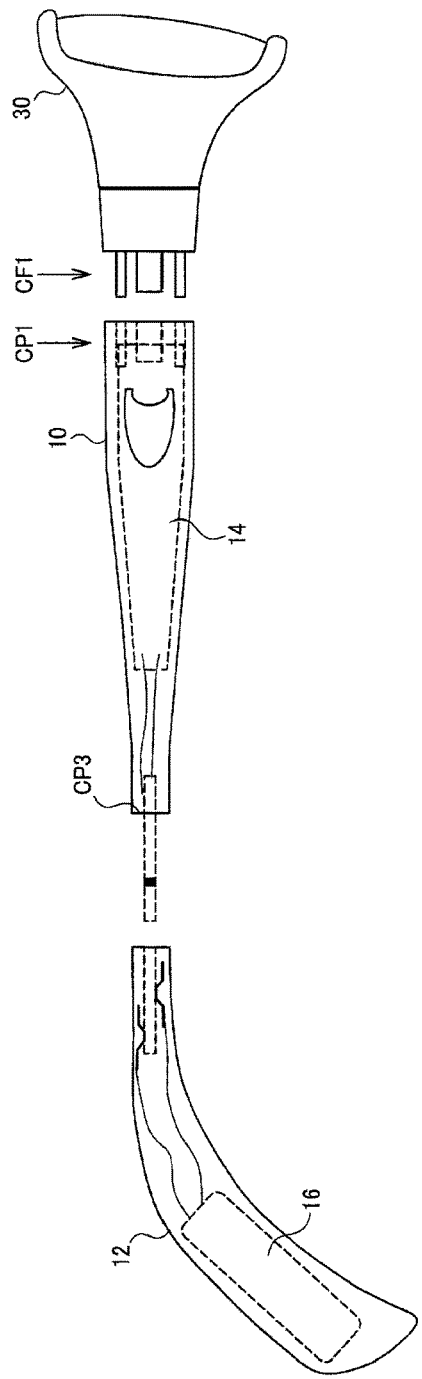
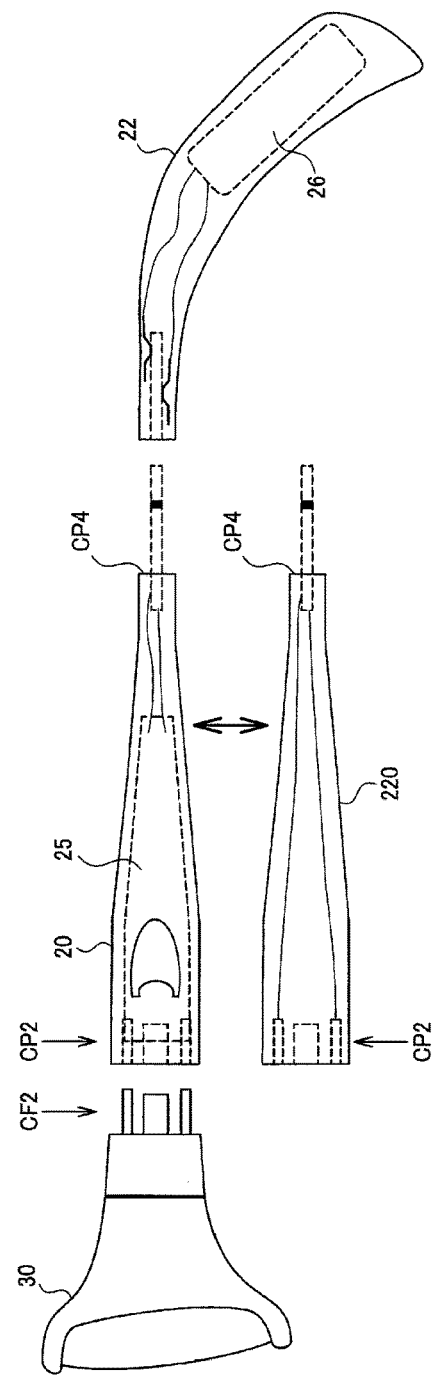
FIG. 10A
FIG. 10B

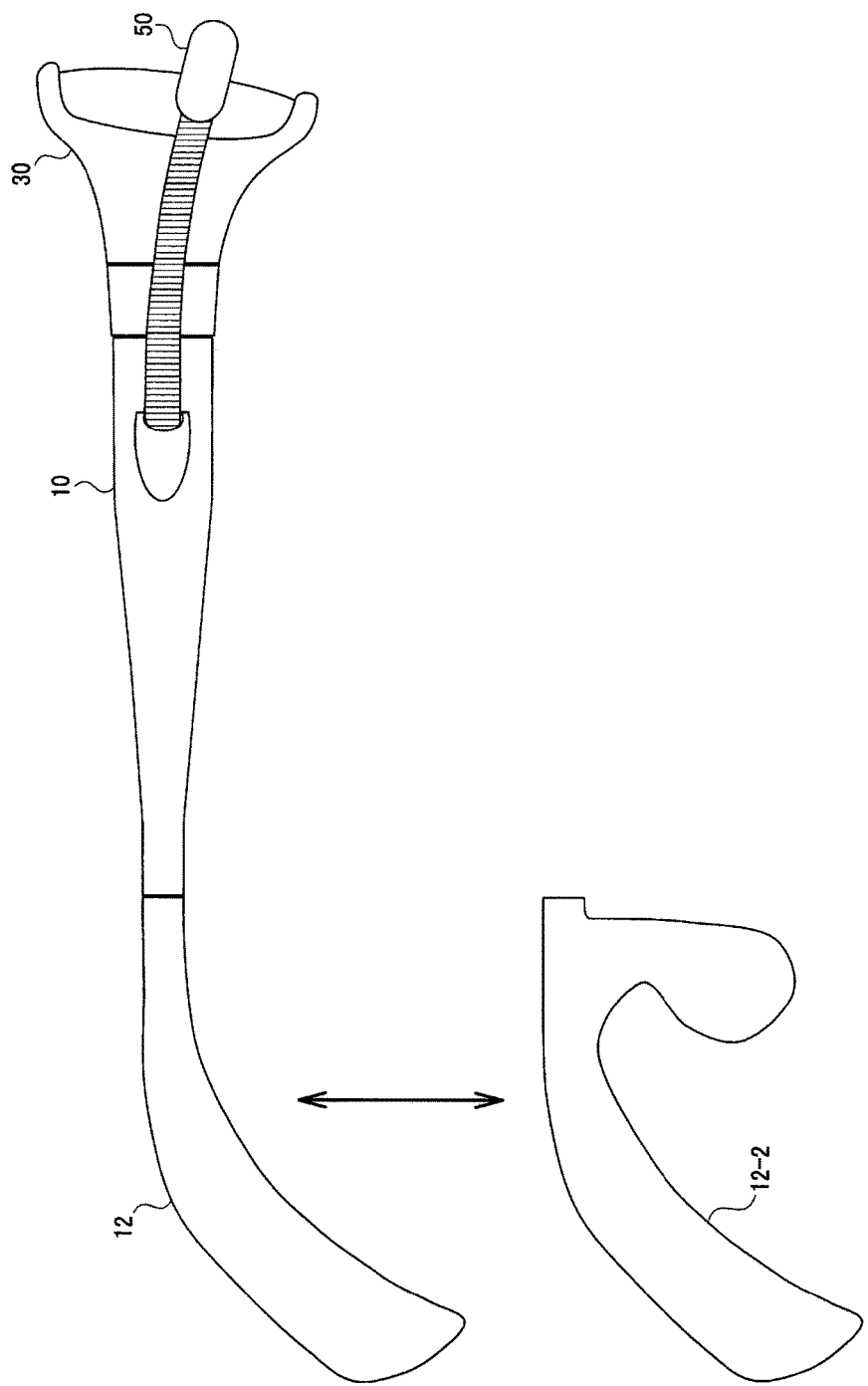

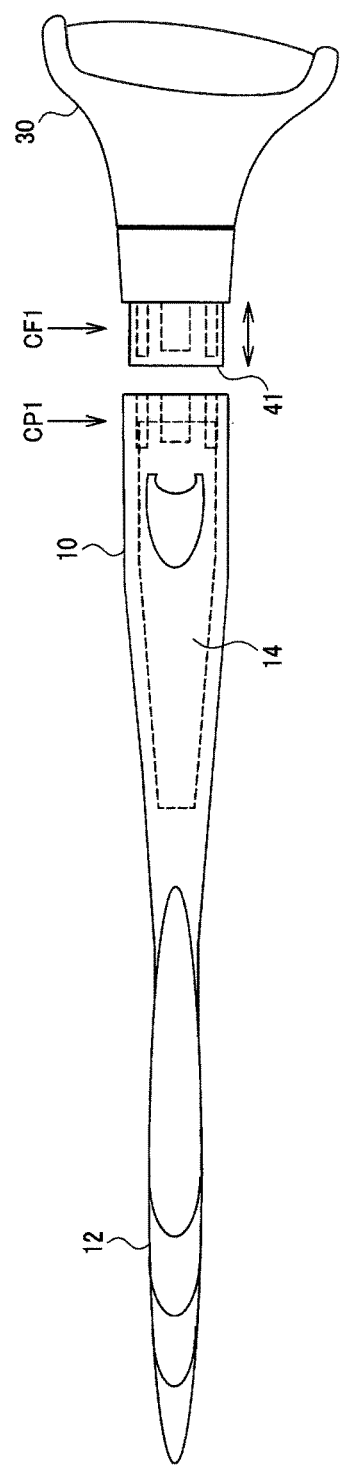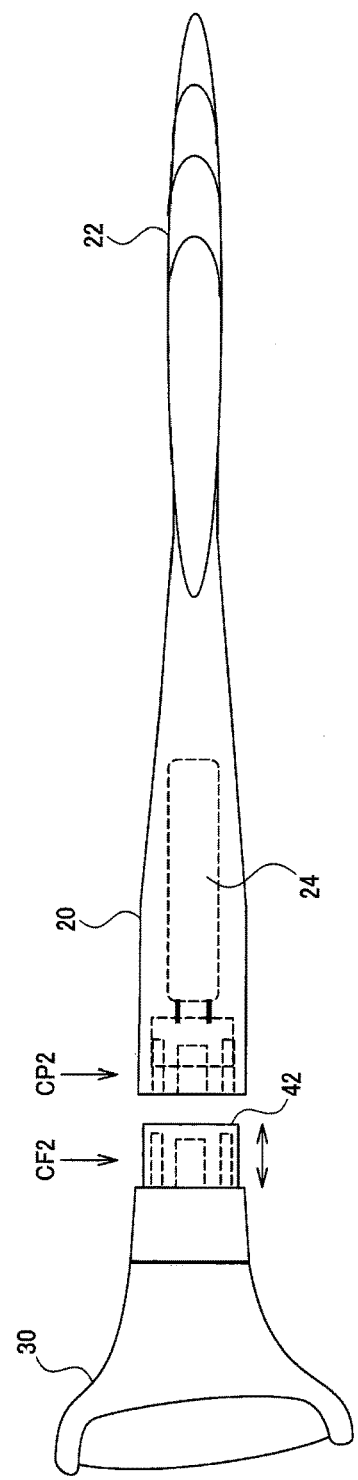
FIG. 17A
FIG. 17B

FIG. 21A
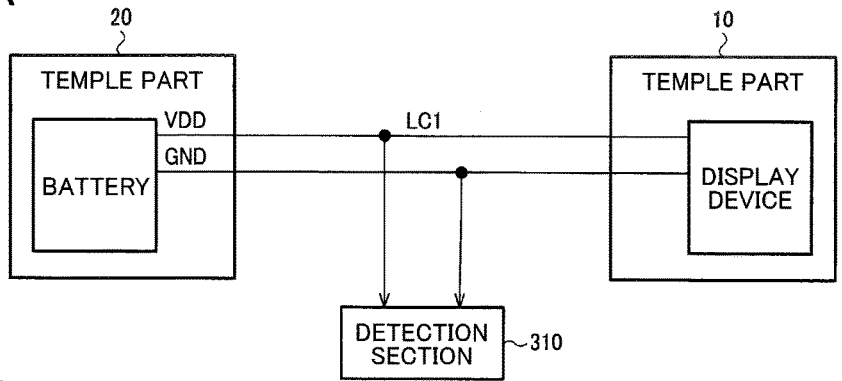
FIG. 21B
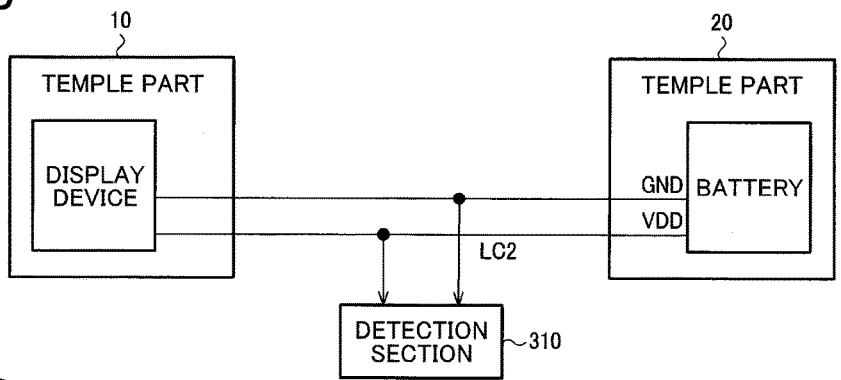
FIG. 21C
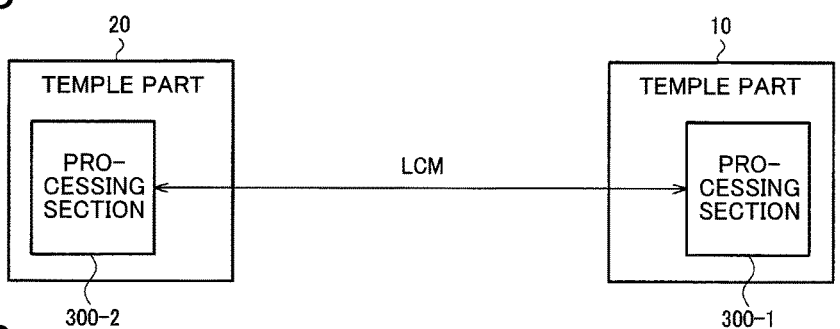
FIG. 21D
| TEMPLE ID | PROCESS |
|---|---|
| ID1 | PP1 |
| ID2 | PP2 |
| ID3 | PP3 |
| ⋮ | ⋮ |

EYEGLASS-TYPE WEARABLE DEVICE, AND FRONT PART AND TEMPLE PART OF EYEGLASS-TYPE WEARABLE DEVICE

CROSS REFERENCE TO RELATED APPLICATION

This application is a continuation of International Patent Application No. PCT/JP2013/063925, having an international filing date of May 20, 2013, which designated the United States, the entirety of which is incorporated herein by reference. Japanese Patent Application No. 2012-115361 filed on May 21, 2012 and Japanese Patent Application No. 2012-115362 filed on May 21, 2012 are also incorporated herein by reference in their entirety.

BACKGROUND

The present invention relates to an eyeglass-type wearable device, a front part and a temple part of an eyeglass-type wearable device, and the like.

In recent years, an eyeglass-type wearable device that can be used as a head-mounted display (HMD) and the like has attracted attention. For example, JP-A-2010-91748 and JP-A-2012-8290 disclose a technique relating to such an eyeglass-type wearable device.

JP-A-2010-91748 discloses a technique that secures a head-mounted display on a head support frame (e.g., eyeglass frame). JP-A-2012-8290 discloses a technique that incorporates a head-mounted display in a dedicated eyeglass frame. Specifically, it has become possible to secure a wearable device on an eyeglass frame, or incorporate a wearable device in an eyeglass frame along with a reduction in the size of a wearable device.

SUMMARY

According to one aspect of the invention, there is provided an eyeglass-type wearable device comprising:

a first temple part that is positioned along one temporal region of a user when the eyeglass-type wearable device is worn by the user;

a second temple part that is positioned along the other temporal region of the user when the eyeglass-type wearable device is worn by the user; and a front part that is positioned in front of a face of the user when the eyeglass-type wearable device is worn by the user, the first temple part including a first electrical unit, the second temple part including a second electrical unit, and the front part including:

a first connection section to which the first temple part is connected;

a second connection section to which the second temple part is connected; and a connection line that electrically connects the first electrical unit of the first temple part and the second electrical unit of the second temple part when the first temple part and the second temple part are connected to the front part.

According to another aspect of the invention, there is provided a front part of an eyeglass-type wearable device that is positioned in front of a face of a user when the eyeglass-type wearable device is worn by the user, the front part comprising:

a first connection section to which a first temple part is connected, the first temple part being positioned along one temporal region of the user when the eyeglass-type wearable device is worn by the user;

a second connection section to which a second temple part is connected, the second temple part being positioned along the other temporal region of the user when the eyeglass-type wearable device is worn by the user; and a connection line that electrically connects a first electrical unit of the first temple part and a second electrical unit of the second temple part when the first temple part and the second temple part are connected to the front part.

According to another aspect of the invention, there is provided an eyeglass-type wearable device comprising:

a first temple part that is positioned along one temporal region of a user when the eyeglass-type wearable device is worn by the user;

a second temple part that is positioned along the other temporal region of the user when the eyeglass-type wearable device is worn by the user; and a front part that is positioned in front of a face of the user when the eyeglass-type wearable device is worn by the user, the front part including a first connection section and a second connection section, at least one of the first temple part and the second temple part including an electrical unit, and the first temple part and the second temple part being able to be attached to and removed from the first connection section and the second connection section of the front part.

According to another aspect of the invention, there is provided a temple part of an eyeglass-type wearable device that can be connected to a front part that is positioned in front of a face of a user when the eyeglass-type wearable device is worn by the user, the temple part comprising:

an electrical unit that is at least one of an electrical part and a battery; and a connection section that can be connected to a first connection section and a second connection section of the front part, the connection section including a temple-side terminal that is connected to a terminal included in the first connection section or the second connection section of the front part when the temple part is connected to the front part.

BRIEF DESCRIPTION OF THE DRAWINGS

FIGS. 7A and 7B are views illustrating a method that provides a battery in a temple tip part of a temple part.

FIGS. 10A and 10B are views illustrating a method that changes or enhances a function by replacing a temple part.

FIG. 14 is a view illustrating replacement of a temple tip part of a temple part.

FIGS. 17A and 17B are views illustrating a method that provides a cover section to a connection section of a front part.

FIGS. 21A to 21D are views illustrating a temple part type detection method.

DESCRIPTION OF EXEMPLARY EMBODIMENTS

Figure 1:
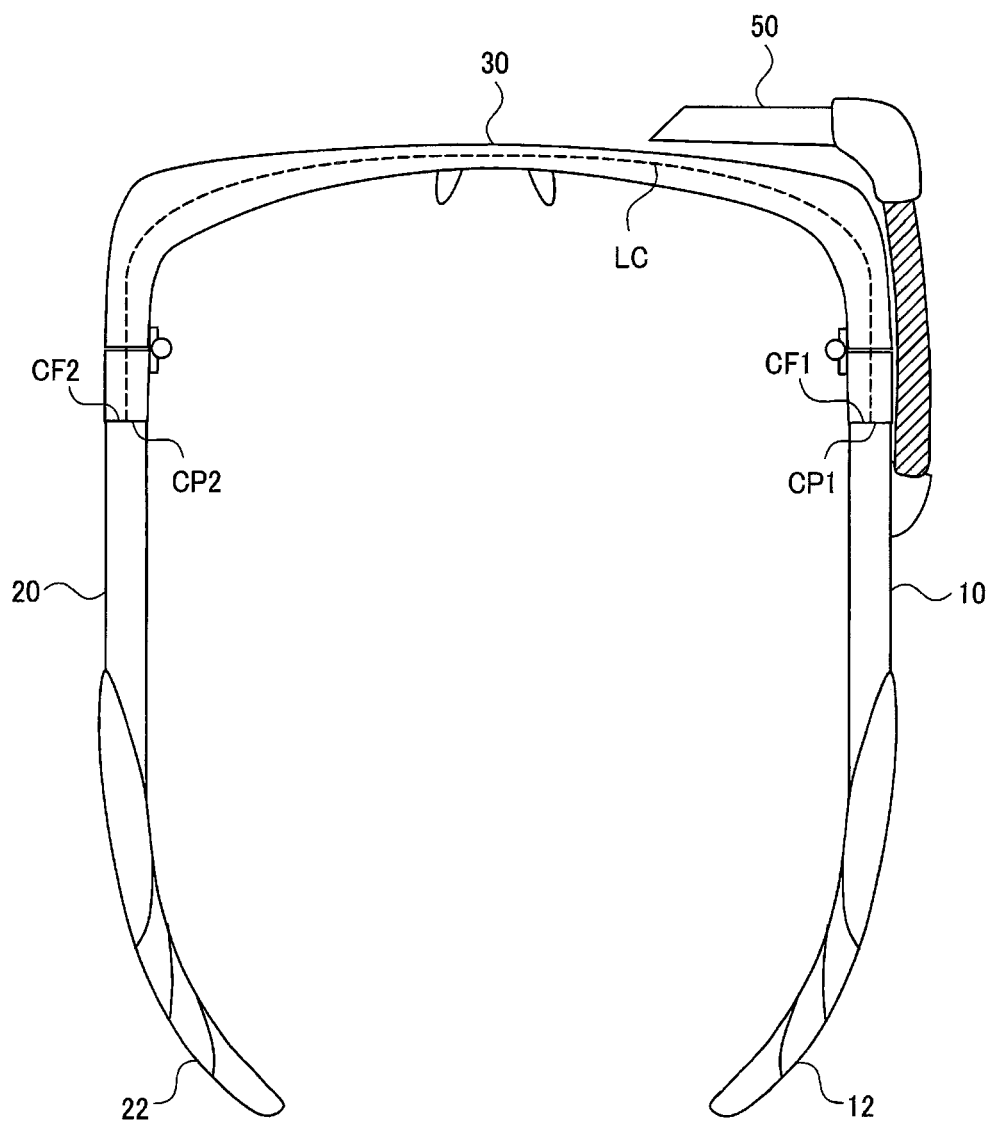
FIG. 1 is a top view of an eyeglass-type wearable device according to one embodiment of the invention.

Several aspects of the invention may provide an eyeglass-type wearable device, a front part and a temple part of an eyeglass-type wearable device, and the like that make it possible to deal with a wide variety of applications, and improve the weight balance, for example.

According to one embodiment of the invention, there is provided an eyeglass-type wearable device comprising:

a first temple part that is positioned along one temporal region of a user when the eyeglass-type wearable device is worn by the user;

a second temple part that is positioned along the other temporal region of the user when the eyeglass-type wearable device is worn by the user; and a front part that is positioned in front of a face of the user when the eyeglass-type wearable device is worn by the user, the first temple part including a first electrical unit, the second temple part including a second electrical unit, and the front part including:

a first connection section to which the first temple part is connected;

a second connection section to which the second temple part is connected; and a connection line that electrically connects the first electrical unit of the first temple part and the second electrical unit of the second temple part when the first temple part and the second temple part are connected to the front part.

According to this configuration, the eyeglass-type wearable device includes the first temple part that includes the first electrical unit, the second temple part that includes the second electrical unit, and the front part that includes the first connection section and the second connection section. The first electrical unit of the first temple part and the second electrical unit of the second temple part are electrically connected through the connection line provided in the front part when the first temple part and the second temple part are connected to the front part. According to the configuration in which the first temple part, the second temple part, and the front part are provided, it is possible to deal with a wide variety of applications by connecting the first temple part and the second temple part to the front part, for example. It is expected that the weight balance is improved by providing the electrical unit to the first temple part and the second temple part instead of the front part, for example. Since a signal and power can be exchanged between the first electrical unit of the first temple part and the second electrical unit of the second temple part through the connection line provided in the front part, it is possible to easily deal with a wide variety of applications, for example.

In the eyeglass-type wearable device, the first connection section of the front part may be a connection section to which the second temple part can be connected instead of the first temple part, and the second connection section of the front part may be a connection section to which the first temple part can be connected instead of the second temple part.

According to this configuration, since the first temple part and the second temple part connected to the front part can be interchanged, it is possible to deal with a wide variety of applications.

In the eyeglass-type wearable device, the first temple part may be connected to the first connection section in a state in which a first side faces in a first direction, and a second side opposite to the first side faces in a second direction that is opposite to the first direction, and connected to the second connection section in a state in which the first side faces in the second direction, and the second side faces in the first direction, and the second temple part may be connected to the second connection section in a state in which a first side faces in the second direction, and a second side opposite to the first side faces in the first direction, and connected to the first connection section in a state in which the first side faces in the first direction, and the second side faces in the second direction.

According to this configuration, the first temple part and the second temple part can be interchanged by rotating the first temple part and the second temple by 180°, and connecting the first temple part and the second temple to the front part, for example.

In the eyeglass-type wearable device, the first connection section may include a first terminal and a second terminal, the second connection section may include a third terminal and a fourth terminal, the first temple part may include a first temple-side terminal that is connected to the first terminal of the first connection section when the first temple part is connected to the first connection section, and connected to the fourth terminal of the second connection section when the first temple part is connected to the second connection section; and a second temple-side terminal that is connected to the second terminal of the first connection section when the first temple part is connected to the first connection section, and connected to the third terminal of the second connection section when the first temple part is connected to the second connection section, and the second temple part may include a third temple-side terminal that is connected to the third terminal of the second connection section when the second temple part is connected to the second connection section, and connected to the second terminal of the first connection section when the second temple part is connected to the first connection section; and a fourth temple-side terminal that is connected to the fourth terminal of the second connection section when the second temple part is connected to the second connection section, and connected to the first terminal of the first connection section when the second temple part is connected to the first connection section.

It is possible to interchange the first temple part and the second temple part by providing the first to fourth terminals and the first to fourth temple-side terminals, and connecting these terminals.

In the eyeglass-type wearable device, when temple parts that are identical in type have respectively been connected to the first connection section and the second connection section, the front part may electrically disconnect electrical units respectively included in the temple parts that are identical in type.

This makes it possible to effectively prevent a problem that occurs when temple parts that are identical in type are connected to the first connection section and the second connection section of the front part.

In the eyeglass-type wearable device, the front part may include a first connection line and a second connection line as the connection line, the first connection line electrically connecting the first electrical unit of the first temple part and the second electrical unit of the second temple part when the first temple part has been connected to the first connection section, and the second temple part has been connected to the second connection section, and the second connection line electrically connecting the first electrical unit of the first temple part and the second electrical unit of the second temple part when the second temple part has been connected to the first connection section, and the first temple part has been connected to the second connection section.

According to this configuration, the first electrical unit of the first temple part and the second electrical unit of the second temple part can be electrically connected through the first connection line when the first temple part has been connected to the first connection section, and the second temple part has been connected to the second connection section, and can be electrically connected through the second connection line when the second temple part has been connected to the first connection section, and the first temple part has been connected to the second connection section.

In the eyeglass-type wearable device, the first connection section of the front part may include a first terminal that is connected to the first connection line, and a second terminal that is connected to the second connection line, the second connection section of the front part may include a third terminal that is connected to the first connection line, and a fourth terminal that is connected to the second connection line, the first electrical unit of the first temple part and the second electrical unit of the second temple part may be electrically connected through the first terminal of the first connection section, the first connection line, and the third terminal of the second connection section, when the first temple part has been connected to the first connection section, and the second temple part has been connected to the second connection section, and the second electrical unit of the second temple part and the first electrical unit of the first temple part may be electrically connected through the second terminal of the first connection section, the second connection line, and the fourth terminal of the second connection section, when the second temple part has been connected to the first connection section, and the first temple part has been connected to the second connection section.

According to this configuration, the first electrical unit of the first temple part and the second electrical unit of the second temple part can be electrically connected through the first to fourth terminals of the first and second connection sections and the first and second connection lines when the first temple part has been connected to the first connection section, and the second temple part has been connected to the second connection section, or when the second temple part has been connected to the first connection section, and the first temple part has been connected to the second connection section.

In the eyeglass-type wearable device, the first electrical unit of the first temple part may include an electrical part, the second electrical unit of the second temple part may include a battery that supplies power to the electrical part, power supplied from the battery included in the second temple part may be supplied to the electrical part included in the first temple part through the first terminal of the first connection section, the first connection line, and the third terminal of the second connection section, when the first temple part has been connected to the first connection section, and the second temple part has been connected to the second connection section, and power supplied from the battery included in the second temple part may be supplied to the electrical part included in the first temple part through the second terminal of the first connection section, the second connection line, and the fourth terminal of the second connection section, when the second temple part has been connected to the first connection section, and the first temple part has been connected to the second connection section.

According to this configuration, power supplied from the battery included in the second temple part can be supplied to the electrical part included in the first temple part through the first to fourth terminals of the first and second connection sections and the first and second connection lines when the first temple part has been connected to the first connection section, and the second temple part has been connected to the second connection section, or when the second temple part has been connected to the first connection section, and the first temple part has been connected to the second connection section.

In the eyeglass-type wearable device, when temple parts that are identical in type and provided with the battery have respectively been connected to the first connection section and the second connection section, the front part may electrically disconnect the batteries respectively included in the temple parts that are identical in type.

This makes it possible to effectively prevent a problem such as a short circuit that occurs when temple parts that are identical in type and provided with a battery are connected to the first connection section and the second connection section of the front part.

The eyeglass-type wearable device may further include a display device that is provided to the first temple part, and the display device may include a display section, an eyepiece optical system that allows the user to observe an image displayed on the display section as a virtual image, and a support section that supports an eye piece of the eyepiece optical system in front of the front part.

This makes it possible to provide an eyeglass-type wearable device that utilizes the display device of the first temple part, and allows the user to observe an image displayed on the display section as a virtual image.

In the eyeglass-type wearable device, a battery may be provided to a temple tip part of at least one of the first temple part and the second temple part.

According to this configuration, it is possible to supply power to the electrical part of the electrical unit using the battery, and improve the weight balance, for example.

The eyeglass-type wearable device may further include a first cover section that covers a terminal of the first temple part or a terminal of the first connection section when the first temple part is not connected to the front part, and a second cover section that covers a terminal of the second temple part or a terminal of the second connection section when the second temple part is not connected to the front part.

The first cover section and the second cover section make it possible to effectively prevent a situation in which electrical failure, a deterioration in waterproofness, and the like occur when the terminal of the connection is exposed when the first temple part or the second temple part is not connected to the front part, for example.

The eyeglass-type wearable device may further include a detection section that detects a type of a temple part connected to the front part, and a processing section that performs a process based on a detection result of the detection section.

According to this configuration, it is possible to determine the function that is changed or enhanced by the temple part by detecting the type of the temple part, and perform a process corresponding to the type of the temple part, for example.

The eyeglass-type wearable device may further include at least one of a display device that displays an image to the user and an imaging device that captures an image, and the processing section may perform image processing based on the detection result of the detection section on the image displayed on the display device or the image captured by the imaging device.

According to this configuration, it is possible to perform appropriate image processing on the image displayed on the display device or the image captured by the imaging device even when the temple parts connected to the front part have been interchanged, for example.

According to another embodiment of the invention, there is provided a front part of an eyeglass-type wearable device that is positioned in front of a face of a user when the eyeglass-type wearable device is worn by the user, the front part comprising:

a first connection section to which a first temple part is connected, the first temple part being positioned along one temporal region of the user when the eyeglass-type wearable device is worn by the user;

a second connection section to which a second temple part is connected, the second temple part being positioned along the other temporal region of the user when the eyeglass-type wearable device is worn by the user; and a connection line that electrically connects a first electrical unit of the first temple part and a second electrical unit of the second temple part when the first temple part and the second temple part are connected to the front part.

The front part of the eyeglass-type wearable device includes the first connection section and the second connection section to which the first temple part that includes the first electrical unit and the second temple part that includes the second electrical unit are connected. The first electrical unit of the first temple part and the second electrical unit of the second temple part are electrically connected through the connection line provided in the front part when the first temple part and the second temple part are connected to the front part. According to the front part having the above configuration, it is possible to deal with a wide variety of applications by connecting the first temple part and the second temple part to the front part, for example. Since the electrical unit can be provided to the first temple part and the second temple part instead of the front part, it is expected that the weight balance and the like are improved. Since a signal and power can be exchanged between the first electrical unit of the first temple part and the second electrical unit of the second temple part through the connection line provided in the front part, it is possible to easily deal with a wide variety of applications, for example.

According to another embodiment of the invention, there is provided an eyeglass-type wearable device comprising:

a first temple part that is positioned along one temporal region of a user when the eyeglass-type wearable device is worn by the user;

a second temple part that is positioned along the other temporal region of the user when the eyeglass-type wearable device is worn by the user; and a front part that is positioned in front of a face of the user when the eyeglass-type wearable device is worn by the user, the front part including a first connection section and a second connection section, at least one of the first temple part and the second temple part including an electrical unit, and the first temple part and the second temple part being able to be attached to and removed from the first connection section and the second connection section of the front part.

According to this configuration, the eyeglass-type wearable device includes the front part that includes the first connection section and the second connection section, the first temple part, and the second temple part, and at least one of the first temple part and the second temple part includes the electrical unit. The first temple part and the second temple part can be attached to and removed from the first connection part and the second connection part of the front part. According to this configuration, since various types of temple part can be removably connected to the front part, it is possible to deal with a wide variety of applications, for example. For example, it is possible to change or enhance the function of the eyeglass-type wearable device by connecting temple parts having various electrical units to the front part, for example. This makes it possible to provide a novel eyeglass-type wearable device. It is expected that the weight balance and the design are improved by providing the electrical unit to the first temple part and the second temple part instead of the front part, for example.

In the eyeglass-type wearable device, at least one of the first temple part and the second temple part may include at least one of a display device, an imaging device, and a battery as the electrical unit.

According to this configuration, it is possible to provide the eyeglass-type wearable device with an image display function by connecting the temple part provided with the display device to the front part, or provide the eyeglass-type wearable device with an image capture function by connecting the temple part provided with the imaging device to the front part, for example. It is also possible to supply power to the electrical part of the eyeglass-type wearable device by connecting the temple part provided with the battery to the front part.

In the eyeglass-type wearable device, at least one of the first temple part and the second temple part may include a battery as the electrical unit, and the battery may be provided to a temple tip part of the at least one of the first temple part and the second temple part.

According to this configuration, it is possible to supply power to the electrical part of the electrical unit using the battery, and improve the weight balance, for example.

In the eyeglass-type wearable device, the at least one of the first temple part and the second temple part may include the temple tip part in which the battery is provided, and a connection section to which the temple tip part is removably connected.

When the connection section to which the temple tip part is removably connected is provided, the temple tip part in which the battery is provided can be attached to and removed from the temple part, and convenience to the user can be improved.

Exemplary embodiments of the invention are described in detail below. Note that the following exemplary embodiments do not in any way limit the scope of the invention laid out in the claims. Note also that all of the elements described below in connection with the following exemplary embodiments should not necessarily be taken as essential elements of the invention.

1. Eyeglass-Type Wearable Device

Figure 2A:
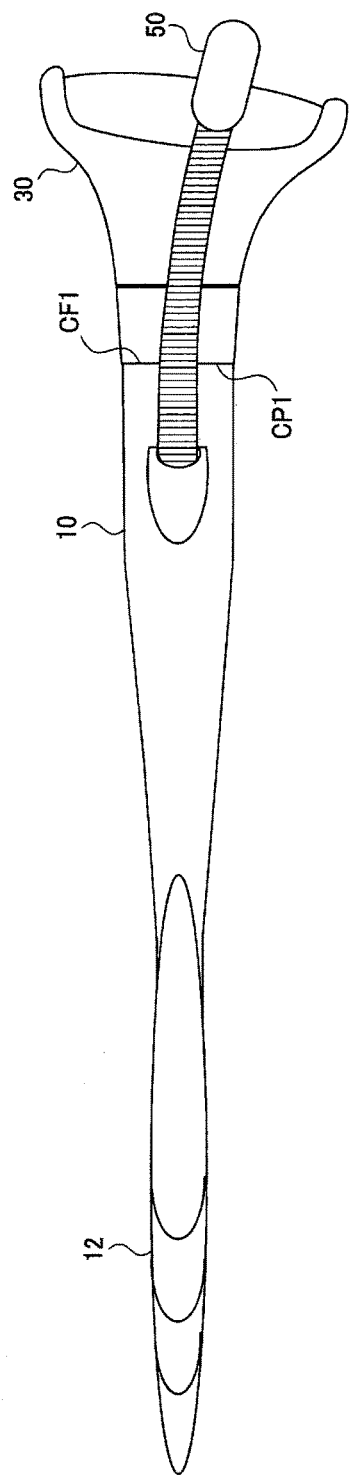
FIGS. 2A and 2B are right side views of an eyeglass-type wearable device according to one embodiment of the invention.
Figure 2B:
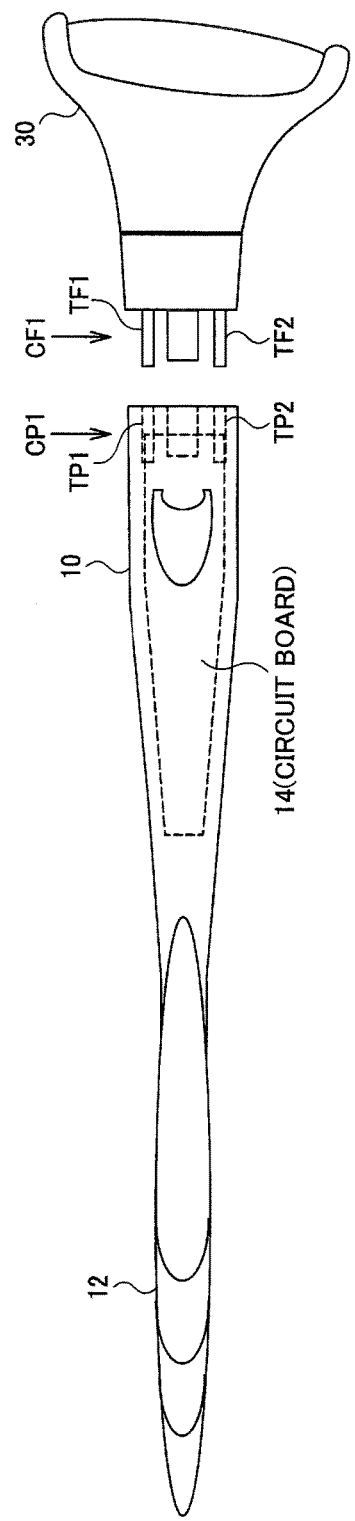
Figure 3:
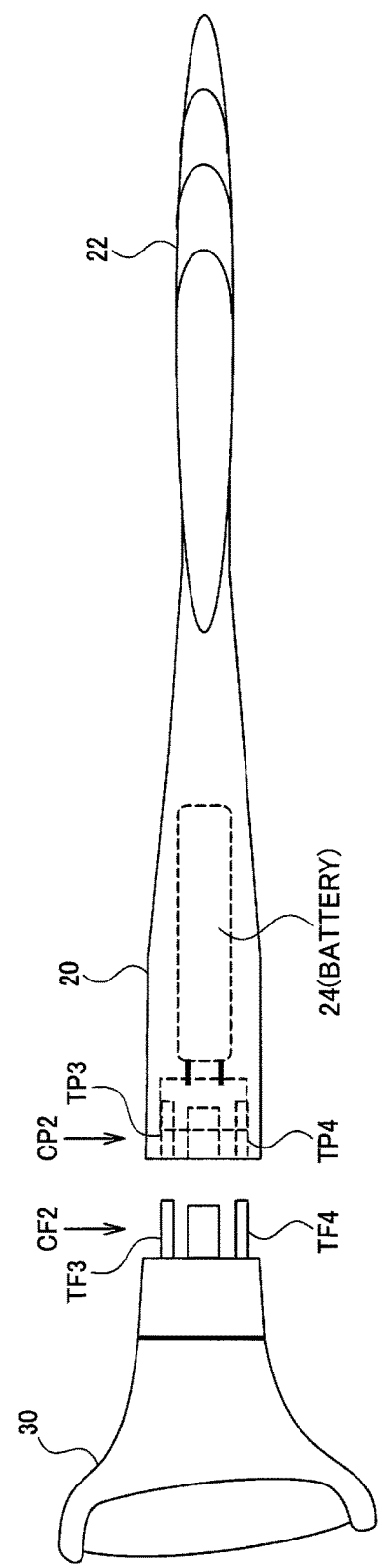
FIG. 3 is a left side view of an eyeglass-type wearable device according to one embodiment of the invention.

FIGS. 1 to 3 illustrate a configuration example of an eyeglass-type wearable device according to one embodiment of the invention. FIG. 1 is a top view of the eyeglass-type wearable device. FIGS. 2A and 2B are right side views of the eyeglass-type wearable device, and FIG. 3 is a left side view of the eyeglass-type wearable device.

The eyeglass-type wearable device (electronic eyeglass frame) includes a first temple part 10, a second temple part 20, and a front part 30. The eyeglass-type wearable device is a device that has an eyeglass-type frame so that the user can wear the device. For example, the eyeglass-type wearable device illustrated in FIG. 1 includes a display device 50, and functions as a head-mounted display (HMD). Note that the eyeglass-type wearable device may include an imaging device (camera) instead of a display device, and function as a live camera, for example. The eyeglass-type wearable device may be a device for the user to wear a sensor that differs from a display device and an imaging device.

The first temple part 10 and the second temple part 20 correspond to the temples of eyeglasses. Specifically, the first temple part 10 is positioned along one temporal region of the user when the eyeglass-type wearable device is worn by the user. The second temple part 20 is positioned along the other temporal region of the user when the eyeglass-type wearable device is worn by the user. In the example illustrated in FIG. 1, the first temple part 10 is positioned along the right temporal region (one temporal region in a broad sense) of the user when the eyeglass-type wearable device is worn by the user, and the second temple part 20 is positioned along the left temporal region (the other temporal region in a broad sense) of the user when the eyeglass-type wearable device is worn by the user. Specifically, the first temple part 10 is positioned on the right side of the head of the user, and the second temple part 20 is positioned on the left side of the head of the user. Note that the eyeglass-type wearable device is configured so that the right temple part and the left temple part can be interchanged (described later). For example, when the right temple part and the left temple part are interchanged with respect to the state illustrated in FIG. 1, the first temple part 10 is positioned along the left temporal region, and the second temple part 20 is positioned along the right temporal region.

The front part 30 corresponds to the rim and the bridge of eyeglasses. The front part 30 is positioned in front of (on the front side of) the face of the user when the eyeglass-type wearable device is worn by the user. For example, when the eyeglass-type wearable device functions as a see-through head-mounted display (HMD), the areas of the front part 30 corresponding to the left eye and the right eye are formed in the shape of a rim such as that of eyeglasses, and the user can see an image in which the display image displayed on the display device 50 is superimposed on the external field of view (external sight). Note that the front part may not include a lens, and may include only a frame.

In one embodiment of the invention, at least one of the first temple part 10 and the second temple part 20 includes an electrical unit. Specifically, at least one of the first temple part 10 and the second temple part 20 includes at least one of a display device, an imaging device, and a battery as the electrical unit. For example, the first temple part 10 includes a first electrical unit, and a second temple part 20 includes a second electrical unit. The electrical unit is implemented by an electrical part such as a circuit board, a display device, or an imaging device, or a power supply component such as a battery, for example.

As illustrated in FIGS. 2A and 2B, electrical parts such as the display device 50 and a circuit board 14 are provided to the first temple part 10 as the first electrical unit (electrical unit in a broad sense). The display device 50 is an eyepiece display device described later, for example. Circuit devices (elements) such as an integrated circuit (IC) and an active device (e.g., resistor and capacitor) are mounted on the circuit board 14. The IC may be a driver IC for the display device 50, an IC for the imaging device, a sensor IC, a wireless IC, and the like.

As illustrated in FIG. 3, a battery 24 (secondary battery or primary battery) is provided to the second temple part 20 as the second electrical unit (electrical unit in a broad sense). Note that an electrical part such as a display device, an imaging device, or a circuit board may be provided as the second electrical unit (electrical unit).

As illustrated in FIG. 7B and the like, at least one of the first temple part 10 and the second temple part 20 may include a battery as the electrical unit, and the battery may be provided in a temple tip part (12, 22) of the at least one of the first temple part 10 and the second temple part 20. Specifically, at least one of the first temple part 10 and the second temple part 20 may include the temple tip part in which a battery is provided, and a connection section (CP3) to which the temple tip part is removably connected.

The first temple part 10 and the second temple part 20 can be attached to and removed from a first connection section CF1 and a second connection section CF2 of the front part 30. Specifically, the first temple part 10 and the second temple part 20 can be removably connected to the first connection section CF1 and the second connection section CF2, respectively.

As illustrated in FIGS. 1 to 3, the front part 30 of the eyeglass-type wearable device includes the first connection section CF1 and the second connection section CF2. For example, the first connection section CF1 is provided at the right end of the front part 30 when viewed from the user, and the second connection section CF2 is provided at the left end of the front part 30 when viewed from the user.

The first connection section CF1 is connected to the first temple part 10, and the second connection section CF2 is connected to the second temple part 20, for example. In one embodiment of the invention, the first temple part 10 and the second temple part 20 can be removably connected to the first connection section CF1 and the second connection section CF2, respectively.

The first connection section CF1 is a connection section to which the second temple part 20 can be connected instead of the first temple part 10 (described later). The second connection section CF2 is a connection section to which the first temple part 10 can be connected instead of the second temple part 20. Specifically, the first connection section CF1 and the second connection section CF2 are configured so that various types of temple part can be connected thereto.

The first temple part 10 and the second temple part 20 include a first connection section CP1 and a second connection section CP2, respectively. The first connection section CP1 and the second connection section CP2 can be connected to the first connection section CF1 and the second connection section CF2, respectively.

Specifically, the first connection section CF1 includes a first terminal TF1 and a second terminal TF2 (see FIG. 2B), and the second connection section CF2 includes a third terminal TF3 and a fourth terminal TF4 (see FIG. 3). The first connection section CP1 includes a first temple-side terminal TP1 and a second temple-side terminal TP2 (see FIG. 2B), and the second connection section CP2 includes a third temple-side terminal TP3 and a fourth temple-side terminal TP4 (see FIG. 3). When the first temple part 10 and the second temple part 20 are connected to the front part 30, the first terminal TF1 and the second terminal TF2 come in contact with the first temple-side terminal TP1 and the second temple-side terminal TP2, respectively, and the third terminal TF3 and the fourth terminal TF4 come in contact with the third temple-side terminal TP3 and the fourth temple-side terminal TP4, respectively.

In one embodiment of the invention, the front part 30 includes a connection line LC that electrically connects the first electrical unit (e.g., circuit board and display device) of the first temple part 10 and the second electrical unit (e.g., battery) of the second temple part 20 when the first temple part 10 and the second temple part 20 are connected to the front part 30. Specifically, the front part 30 includes the connection line LC that is provided between the first connection section CF1 and the second connection section CF2, for example, and the first electrical unit of the first temple part 10 and the second electrical unit of the second temple part 20 are electrically connected through the connection line LC.

As described above, the eyeglass-type wearable device according to one embodiment of the invention is configured so that the first temple part 10 and the second temple part 20 can be attached to and removed from the front part 30 (frame). Electrical connection is achieved via the first connection section CF1, the second connection section CF2, and the connection line LC, so that the electrical unit of the first temple part 10 and the electrical unit of the second temple part 20 (i.e., the electrical unit of the right temple part and the electrical unit of the left temple part) are electrically connected to each other.

The first temple part 10 is provided with the display device 50 that allows the user to closely observe the display image (display picture) as a virtual image, for example. The second temple part 20 can be provided with the battery 24 and an electrical part (electronic part) having a different function (e.g., processing circuit, radio communication device, TV tuner, sensor, and memory), and an image generated using the electrical part can be displayed on the display device 50.

Specifically, the front part 30 includes the connection line LC that electrically connects the right connection section CF1 and the left connection section CF2. The connection line LC electrically connects the first electrical unit (e.g., display device and circuit board) of the first temple part 10 and the second electrical unit (e.g., a power supply component such as a battery, and an electrical part such as a processing circuit) of the second temple part 20 when the first temple part 10 and the second temple part 20 are connected to the front part 30. According to this configuration, power supplied from the battery 24 provided to the second temple part 20 (see FIG. 3) can be supplied to the display device 50 provided to the first temple part 10 (see FIG. 1) to drive the display device 50, for example. When electrical parts (image source) such as a processing circuit, a radio communication device, and a TV tuner are provided to the second temple part 20, image data acquired by these electrical parts can be supplied to the display device 50 provided to the first temple part 10 through the connection line LC to display the display image.

According to one embodiment of the invention, the weight balance of the eyeglass-type wearable device can be improved by dividing the electrical parts (electrical system) between the first temple part 10 and the second temple part 20 (right temple part and left temple part). Since the first temple part 10 and the second temple part 20 can be attached to and removed from the front part 30, it is possible to utilize various devices corresponding to a wide variety of applications, and deal with a wide variety of applications.

Another embodiment of the invention implements the temple part that can be connected to the front part of the eyeglass-type wearable device that is positioned in front of the face of the user when the eyeglass-type wearable device is worn by the user. In this case, the temple part includes the electrical unit that is at least one of an electrical part (e.g., display device, imaging device, or sensor) and a battery, and a connection section (CP1, CP2) that can be connected to the first connection section (CF1) and the second connection section (CF2) of the front part. The connection section (CP1, CP2) includes a temple-side terminal (TP1 to TP4) that is connected to the terminal (TF1 to TF4) included in the first connection section (CF1) or the second connection section (CF2) of the front part.

According to the temple part having such a configuration, it is possible to provide the user with a temple part that makes it possible to change or enhance the function of the eyeglass-type wearable device, and deal with various user demands corresponding to each application.

2. Interchange Between Right Temple Part and Left Temple Part

The eyeglass-type wearable device according to one embodiment of the invention is configured so that the right temple part and the left temple part can be interchanged. Specifically, the first connection section CF1 of the front part 30 is a connection section to which the second temple part 20 can be connected instead of the first temple part 10. The second connection section CF2 of the front part 30 is a connection section to which the first temple part 10 can be connected instead of the second temple part 20. The details of the interchangeable configuration are described below.

Figure 4A:
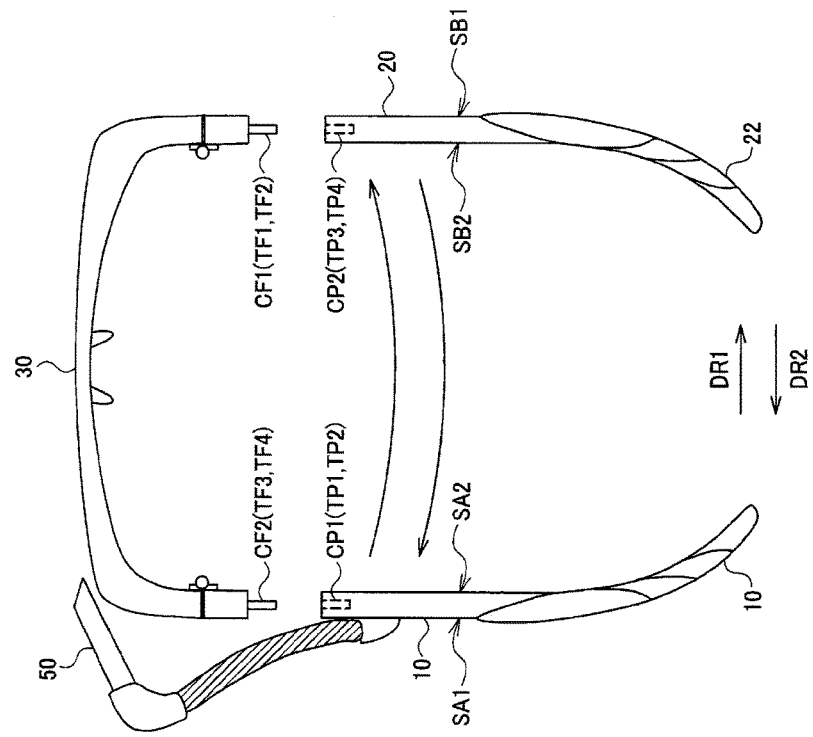
FIGS. 4A and 4B are views illustrating a state in which a first temple part and a second temple part are interchanged.

In FIG. 4A, the first temple part 10 is connected to the connection section CF1 of the front part 30, and the second temple part 20 is connected to the connection section CF2 of the front part 30. Specifically, the connection section CP1 of the first temple part 10 is connected to the connection section CF1 of the front part 30, and the connection section CP2 of the second temple part 20 is connected to the connection section CF2 of the front part 30. In FIG. 4A, the display device 50 is provided to the first temple part 10, and the battery 24 is provided to the second temple part 20, for example. In this case, power supplied from the battery 24 provided to the second temple part 20 can be supplied to the first temple part 10 through the connection line LC (see FIG. 1) to drive (operate) the display device 50. Since the display device 50 is provided corresponding to the right eye of the user, the display image generated by the display device 50 can be displayed on the side of the right eye of the user in a see-through HMD manner.

Figure 4B:
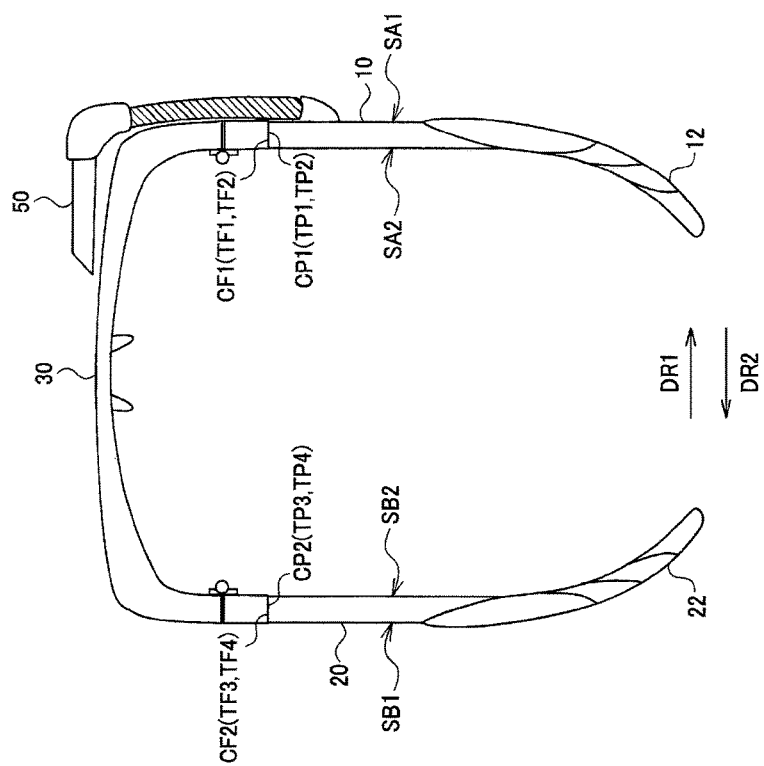

In FIG. 4B, the right temple part and the left temple part have been interchanged with respect to the state illustrated in FIG. 4A (i.e., the second temple part 20 is connected to the connection section CF1 of the front part 30, and the first temple part 10 is connected to the connection section CF2 of the front part 30). Specifically, the connection section CP2 of the second temple part 20 is connected to the connection section CF1 of the front part 30, and the connection section CP1 of the first temple part 10 is connected to the connection section CF2 of the front part 30. Therefore, the display image that is displayed on the side of the right eye of the user in FIG. 4A can be displayed on the side of the left eye of the user in FIG. 4B. This makes it possible to deal with a situation in which the user desires that the display image be displayed on the side of the left eye of the user, for example.

In order to make it possible to interchange the right temple part and the left temple part (see FIGS. 4A and 4B), the first temple part 10 and the second temple part 20 are designed to have a symmetrical structure in the vertical direction.

Specifically, the first temple part 10 is connected to the first connection section CF1 of the front part 30 so that a first side SA1 of the first temple part 10 faces in a first direction DR1, and a second side SA2 of the first temple part 10 faces in a second direction DR2 that is opposite to the first direction DR1 (see FIG. 4A). The first side SA1 is a side that faces in the direction opposite to the user when the eyeglass-type wearable device is worn by the user. For example, the side illustrated in FIG. 2A is the first side SA1 of the first temple part 10. The second side SA2 is a side opposite to the first side SA1. The second side SA2 faces the temporal region of the user when the eyeglass-type wearable device is worn by the user.

The first temple part 10 is connected to the second connection section CF2 of the front part 30 so that the first side SA1 faces in the second direction DR2, and the second side SA2 faces in the first direction DR1 (see FIG. 4B). Specifically, when changing the connection state from the connection state illustrated in FIG. 4A (i.e., the first temple part 10 is connected to the first connection section CF1) to the connection state illustrated in FIG. 4B (i.e., the first temple part 10 is connected to the second connection section CF2), the first temple part 10 is rotated by 180°, and connected to the second connection section CF2 so that each side faces in the opposite direction.

The second temple part 20 is connected to the second connection section CF2 of the front part 30 so that a first side SB1 of the second temple part 20 faces in the second direction DR2, and a second side SB2 of the second temple part 20 faces in the first direction DR1 (see FIG. 4A). The first side SB1 is a side that faces in the direction opposite to the user when the eyeglass-type wearable device is worn by the user. For example, the side illustrated in FIG. 3 is the first side SB1 of the second temple part 20. The second side SB2 is a side opposite to the first side SB1. The second side SB2 faces the temporal region of the user when the eyeglass-type wearable device is worn by the user.

The second temple part 20 is connected to the first connection section CF1 of the front part 30 so that the first side SB1 faces in the first direction DR1, and the second side SB2 faces in the second direction DR2 (see FIG. 4B). Specifically, when changing the connection state from the connection state illustrated in FIG. 4A (i.e., the second temple part 20 is connected to the second connection section CF2) to the connection state illustrated in FIG. 4B (i.e., the second temple part 20 is connected to the first connection section CF1), the second temple part 20 is rotated by 180°, and connected to the first connection section CF1 so that each side faces in the opposite direction.

Figure 5A:
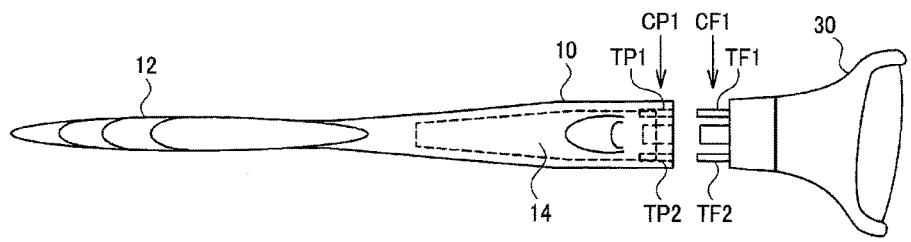
FIGS. 5A to 5D are views illustrating a state in which a first temple part and a second temple part are interchanged.
Figure 5B:
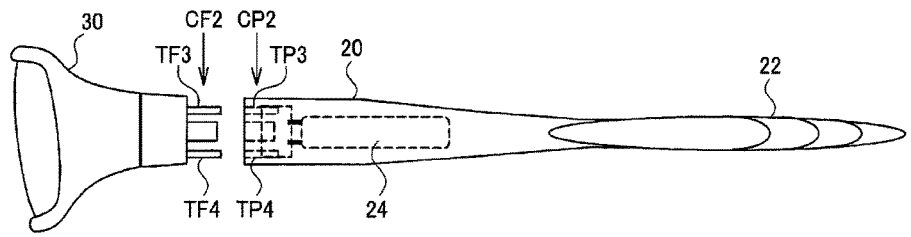

As illustrated in FIGS. 5A and 5B, the first connection section CF1 of the front part 30 includes the first terminal TF1 and the second terminal TF2, and the second connection section CF2 of the front part 30 includes the third terminal TF3 and the fourth terminal TF4. The first temple part 10 (connection section CP1) includes the first temple-side terminal TP1 and the second temple-side terminal TP2, and the second temple part 20 (connection section CP2) includes the third temple-side terminal TP3 and the fourth temple-side terminal TP4. An example in which each of the first connection section CF1, the second connection section CF2, the first temple part 10 (CP1), and the second temple part 20 (CP2) includes two terminals is described below for convenience of explanation. Note that the configuration is not limited thereto. For example, each of the first connection section CF1, the second connection section CF2, the first temple part 10 (CP1), and the second temple part 20 (CP2) may include three or more terminals.

Figure 5C:
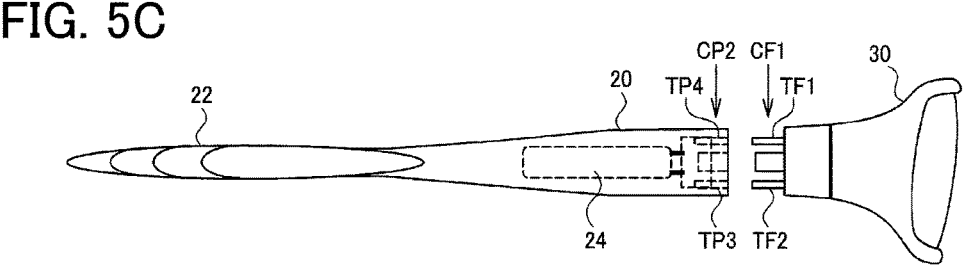
Figure 5D:
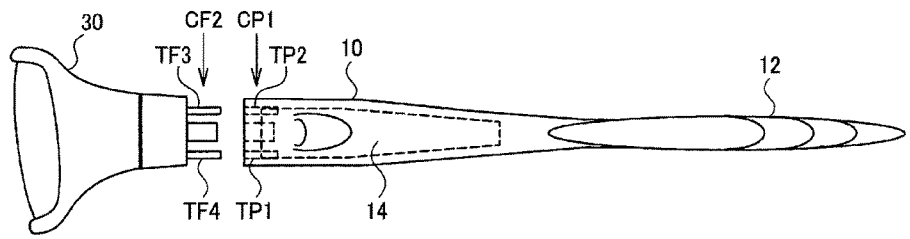

FIGS. 5A and 5B illustrate a terminal connection state when the first temple part 10 is connected to the first connection section CF1, and the second temple part 20 is connected to the second connection section CF2 as illustrated in FIG. 4A. FIGS. 5C and 5D illustrate a terminal connection state when the second temple part 20 is connected to the first connection section CF1, and the first temple part 10 is connected to the second connection section CF2 as illustrated in FIG. 4B. Specifically, FIG. 5C differs from FIG. 5A in that the second temple part 20 is connected to the first connection section CF1 of the front part 30 instead of the first temple part 10, and FIG. 5D differs from FIG. 5B in that the first temple part 10 is connected to the second connection section CF2 of the front part 30 instead of the second temple part 20.

The first temple-side terminal TP1 of the first temple part 10 is connected to the first terminal TF1 of the first connection section CF1 when the first temple part 10 is connected to the first connection section CF1 (see FIG. 5A). The first temple-side terminal TP1 of the first temple part 10 is connected to the fourth terminal TF4 of the second connection section CF2 when the first temple part 10 is connected to the second connection section CF2 (see FIG. 5D).

The second temple-side terminal TP2 of the first temple part 10 is connected to the second terminal TF2 of the first connection section CF1 when the first temple part 10 is connected to the first connection section CF1 (see FIG. 5A). The second temple-side terminal TP2 of the first temple part 10 is connected to the third terminal TP3 of the second connection section CF2 when the first temple part 10 is connected to the second connection section CF2 (see FIG. 5D).

The third temple-side terminal TP3 of the second temple part 20 is connected to the third terminal TF3 of the second connection section CF2 when the second temple part 20 is connected to the second connection section CF2 (see FIG. 5B). The third temple-side terminal TP3 of the second temple part 20 is connected to the second terminal TF2 of the first connection section CF1 when the second temple part 20 is connected to the first connection section CF1 (see FIG. 5C).

The fourth temple-side terminal TP4 of the second temple part 20 is connected to the fourth terminal TP4 of the second connection section CF2 when the second temple part 20 is connected to the second connection section CF2 (see FIG. 5B). The fourth temple-side terminal TP4 of the second temple part 20 is connected to the first terminal TF1 of the first connection section CF1 when the second temple part 20 is connected to the first connection section CF1 (see FIG. 5C).

According to one embodiment of the invention, since the first temple part 10 and the second temple part 20 have a symmetrical structure in the vertical direction as to the pin arrangement and the like, it is possible to interchange the right temple part and the left temple part as illustrated in FIGS. 4A and 4B. This makes it possible to interchange the electrical parts (e.g., display device and imaging device) corresponding to the preference of the user, and deal with a wide variety of applications.

In one embodiment of the invention, the front part 30 electrically disconnects the electrical unit provided to the temple part connected to the first connection section CF1 and the electrical unit provided to the temple part connected to the second connection section CF2 when temple parts that are identical in type (i.e., first temple parts or second temple parts) are respectively connected to the first connection section CF1 and the second connection section CF2 (as described below).

The method employed when the right temple part and the left temple part are interchanged is described in detail below with reference to FIGS. 6A to 6C.

Figure 6A:
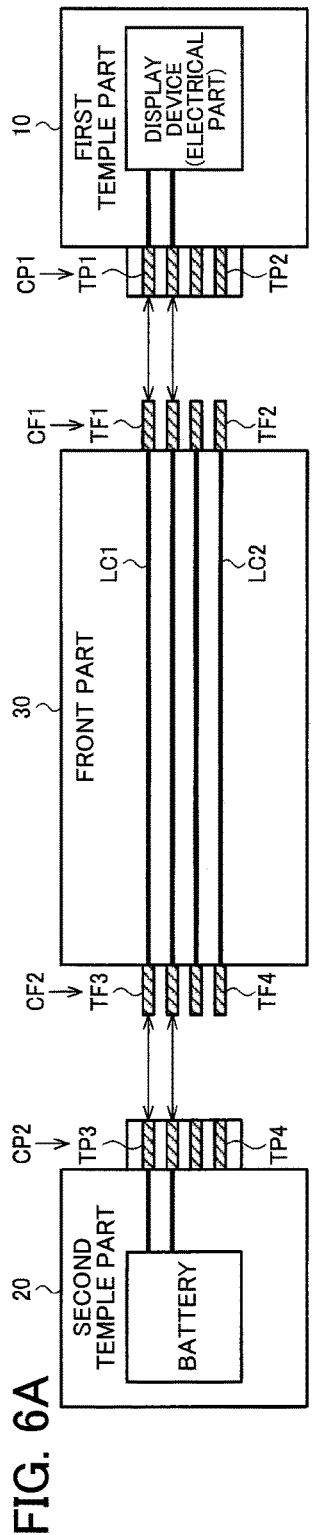
FIGS. 6A to 6C are views illustrating connection lines provided in a front part.

As illustrated in FIG. 6A, a display device is provided to the first temple part 10 as the first electrical unit, and a battery is provided to the second temple part 20 as the second electrical unit. A first connection line LC1 and a second connection line LC2 that electrically connect the display device provided to the first temple part 10 and the battery provided to the second temple part 20 are provided in the front part 30. A VDD connection line and a GND connection line are required when connecting a battery and an electrical part. Note that the following description is given taking the VDD connection line as an example for convenience of explanation.

As illustrated in FIG. 6A, the first connection line LC1 provided in the front part 30 electrically connects the display device (first electrical unit in a broad sense) provided to the first temple part 10 and the battery (second electrical unit in a broad sense) provided to the second temple part 20 when the first temple part 10 is connected to the first connection section CF1 of the front part 30, and the second temple part 20 is connected to the second connection section CF2 of the front part 30. Specifically, the display device provided to the first temple part 10 and the battery provided to the second temple part 20 are electrically connected through the first connection line LC1 provided in the front part 30 when the connection state illustrated in FIG. 4A is established.

Figure 6B:
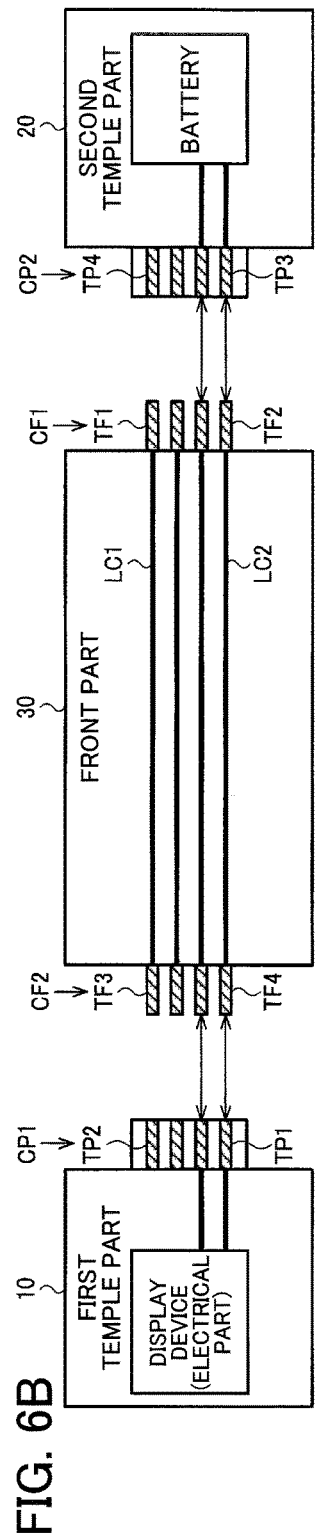

As illustrated in FIG. 6B, the second connection line LC2 provided in the front part 30 electrically connects the display device (first electrical unit) provided to the first temple part 10 and the battery (second electrical unit) provided to the second temple part 20 when the second temple part 20 is connected to the first connection section CF1 of the front part 30, and the first temple part 10 is connected to the second connection section CF2 of the front part 30. Specifically, the display device provided to the first temple part 10 and the battery provided to the second temple part 20 are electrically connected through the second connection line LC2 provided in the front part 30 when the connection state illustrated in FIG. 4B is established.

More specifically, the first connection section CF1 of the front part 30 includes the first terminal TF1 and the second terminal TF2, the first terminal TF1 is connected to the first connection line LC1, and the second terminal TF2 is connected to the second connection line LC2.

The second connection section CF2 of the front part 30 includes the third terminal TF3 and the fourth terminal TF4, the third terminal TF3 is connected to the first connection line LC1, and the fourth terminal TF4 is connected to the second connection line LC2.

When the first temple part 10 is connected to the first connection section CF1, and the second temple part 20 is connected to the second connection section CF2 (see FIG. 4A), the display device (first electrical unit) provided to the first temple part 10 and the battery (second electrical unit) provided to the second temple part 20 are electrically connected through the first terminal TF1 of the first connection section CF1, the first connection line LC1, and the third terminal TF3 of the second connection section CF2 (see FIG. 6A).

Specifically, the first temple-side terminal TP1 connected to the display device is connected to the first terminal TF1, the third temple-side terminal TP3 connected to the battery is connected to the third terminal TF3, and the first terminal TF1 and the third terminal TF3 are connected through the first connection line LC1 (see FIGS. 5A and 5B). The display device (electrical part) provided to the first temple part 10 and the battery provided to the second temple part 20 are thus electrically connected, and power supplied from the battery provided to the second temple part 20 can be supplied to the display device (electrical part) provided to the first temple part 10.

When the second temple part 20 is connected to the first connection section CF1, and the first temple part 10 is connected to the second connection section CF2 (see FIG. 4B), the battery (second electrical unit) provided to the second temple part 20 and the display device (first electrical unit) provided to the first temple part 10 are electrically connected through the second terminal TF2 of the first connection section CF1, the second connection line LC2, and the fourth terminal TF4 of the second connection section CF2 (see FIG. 6B).

Specifically, the third temple-side terminal TP3 connected to the battery is connected to the second terminal TF2, the first temple-side terminal TP1 connected to the display device is connected to the fourth terminal TF4, and the second terminal TF2 and the fourth terminal TF4 are connected through the second connection line LC2 (see FIGS. 5C and 5D). The display device provided to the first temple part 10 and the battery provided to the second temple part 20 are thus electrically connected, and power supplied from the battery provided to the second temple part 20 can be supplied to the display device provided to the first temple part 10.

In one embodiment of the invention, when temple parts provided with a battery are respectively connected to the first connection section CF1 and the second connection section CF2, the batteries are electrically disconnected to prevent occurrence of a short circuit.

Figure 6C:
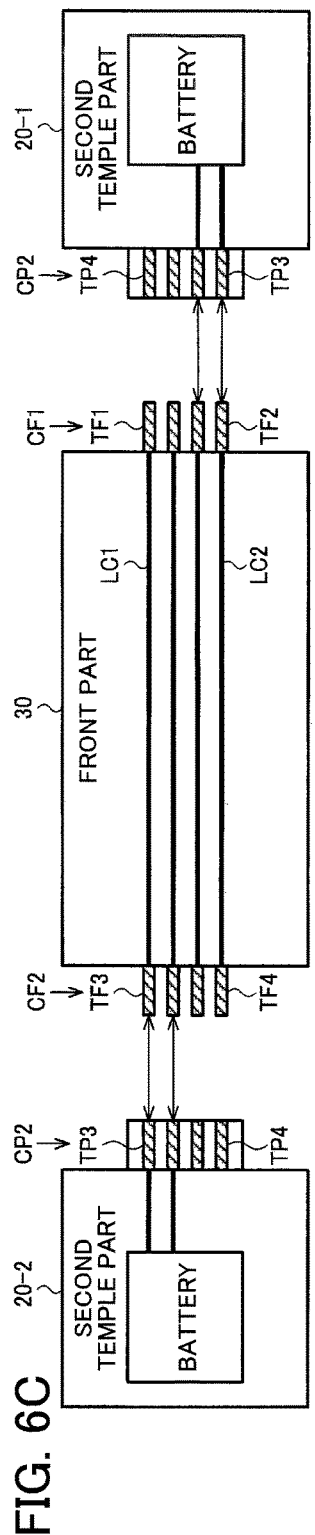

In FIG. 6C, a second temple part 20-1 provided with a battery is connected to the first connection section CF1 of the front part 30, and a second temple part 20-2 provided with a battery is connected to the second connection section CF2 of the front part 30, for example. In this case, the front part 30 electrically disconnects the batteries to prevent occurrence of a short circuit.

For example, the third temple-side terminal TP3 of the second temple part 20-1 is connected to the second terminal TF2 of the front part 30, and the second terminal TF2 is connected to the second connection line LC2. The third temple-side terminal TP3 of the second temple part 20-2 is connected to the third terminal TF3 of the front part 30, and the third terminal TF3 is connected to the first connection line LC1. As illustrated in FIG. 6C, the first connection line LC1 and the second connection line LC2 are electrically disconnected. Therefore, the battery provided to the second temple part 20-1 and the battery provided to the second temple part 20-2 are electrically disconnected, and occurrence of a short circuit between the batteries can be prevented.

According to the method illustrated in FIGS. 6A to 6C, appropriate connection can be implemented when temple parts that differ in type (e.g., a temple part provided with a battery and a temple part provided with a display device) are connected to the front part 30, even when the right temple part and the left temple part are interchanged. On the other hand, when temple parts that are identical in type (e.g., temple parts provided with a battery) are respectively connected to the first connection section CF1 and the second connection section CF2, it is possible to effectively prevent a situation in which the batteries are connected, and short-circuited, since the connection line LC1 and the connection line LC2 are electrically disconnected.

3. Temple Part

In one embodiment of the invention, the temple part can be attached to and removed from the front part, and various temple parts can be connected to the front part corresponding to the application. Various examples of the temple part are described below.

FIGS. 7A and 7B illustrate a detailed example of the temple part. The temple part 10 has a configuration in which a battery 16 is provided in a temple tip part 12. The temple part 10 includes a connection section CP3 through which the temple tip part 12 provided with the battery 16 is removably connected. For example, when the temple tip part 12 is connected to the temple part 10 through the connection section CP3, power supplied from the battery 16 provided in the temple tip part 12 is supplied to the circuit board 14 through connection lines LB1 to LB4 to drive the electrical parts mounted on the circuit board 14. The temple tip part 12 provided with the battery 16 is designed to be removable. The battery 16 provided in the temple tip part 12 can be charged using a charging device or the like by removing the temple tip part 12 from the temple part 10.

According to this configuration, even if the battery has gone dead, the user can immediately operate the electrical parts included in the temple part by replacing the temple tip part with a reserve temple tip parts provided with a battery. In this case, since it is unnecessary to replace the temple part (main body), and it suffices to replace the temple tip part having a small size, convenience to the user can be improved.

Figure 8A:
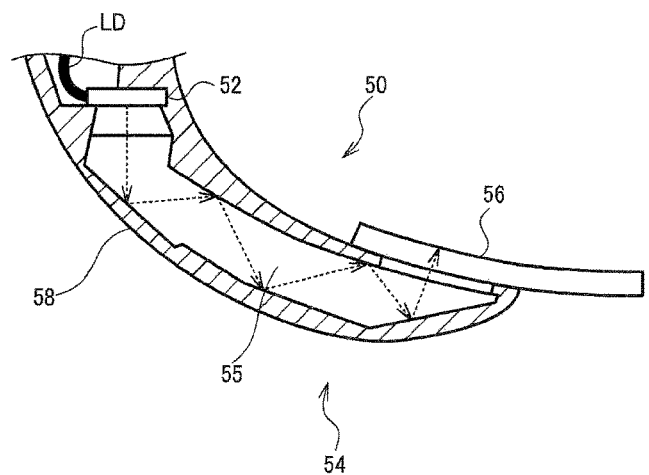
FIGS. 8A and 8B are views illustrating a display device.

In FIG. 7A, the display device 50 is provided to the temple part 10. As illustrated in FIG. 8A, the display device 50 includes a display section 52, an eyepiece optical system 54, and a support section 58.

The display section 52 (display) is implemented by an LCD, an OLED, or the like, and displays an image. The display section 52 is electrically connected to and driven by a driver mounted on the circuit board 14 illustrated in FIG. 2B through a connection line LD. The eyepiece optical system 54 is an optical system that allows the user to observe the image displayed on the display section 52 as a virtual image. The eyepiece optical system 54 includes optical components such as a light-guiding section 55 and an eye piece 56. The display image light from the display section 52 is guided to the eye piece 56 by the light-guiding section 55 of the eyepiece optical system 54. The support section 58 is a member that supports (positions) the eye piece 56 of the eyepiece optical system 54 in front of the front part 30. Specifically, the support section 58 supports the eye piece 56 in front of the right eye or the left eye of the user. The support section 58 is designed to be flexible. The user can adjust the position of the eye piece 56 by bending the support section 58.

Figure 8B:

It is possible to implement a see-through HMD image display (see FIG. 8B) by utilizing the display device 50 having the configuration illustrated in FIG. 8A. Specifically, an image IM generated by the display device 50 can be superimposed on the field of view (sight) of the user. In FIG. 8B, the navigation image IM that guides the user is superimposed on the field of view (sight) of the user. Note that the configuration of the display device 50 is not limited to the configuration illustrated in FIG. 8A. Various modifications and variations may be made.

Figures 9A, 9B, 9C:
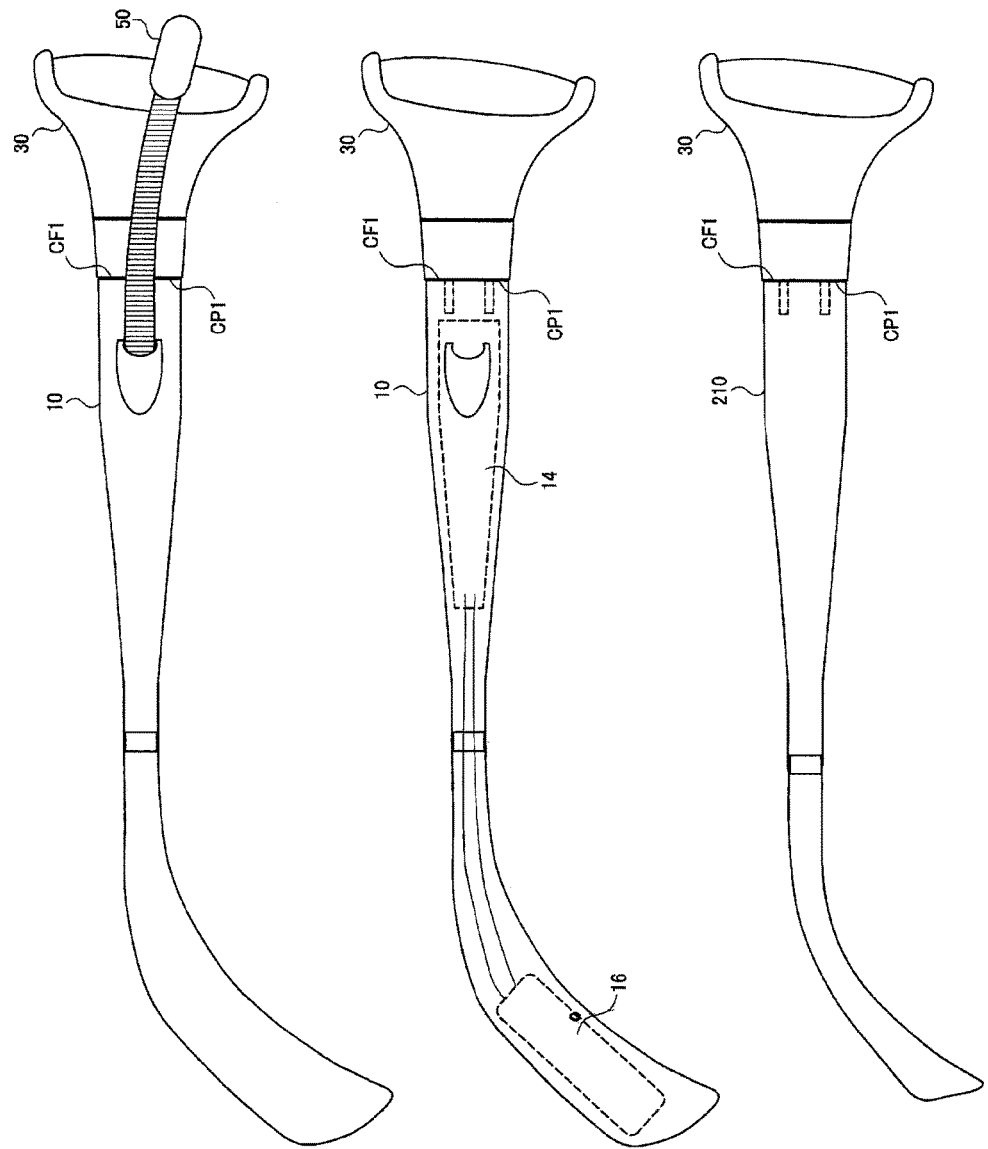
FIGS. 9A to 9C are views illustrating a method that changes or enhances a function by replacing a temple part.

In one embodiment of the invention, temple parts corresponding to a wide variety of applications can be removably connected to the front part of the eyeglass-type wearable device. In FIGS. 9A and 9B, the temple part 10 that is provided with the circuit board 14 and the battery 16 that supplies power to the circuit board 14 and the like is connected to the connection section CF1 of the front part 30, for example. An image as illustrated in FIG. 8B can be displayed in front of the right eye of the user by providing a driver that drives the display section 52 (display panel) of the display device 50 (see FIG. 8A) on the circuit board 14, for example.

In FIG. 9C, a normal eyeglass temple part 210 that is not provided with an electrical system (e.g., circuit board 14 and battery 16 (see FIGS. 9A and 9B)) is connected to the connection section CF1 of the front part 30. For example, when the user does not desire that an image as illustrated in FIG. 8B be displayed, it is possible to meet the user demand by connecting the normal eyeglass temple part 210 illustrated in FIG. 9C to the front part 30.

In FIG. 10A, the connection section CP3 to which the temple tip part 12 is connected is provided to the temple part 10, and the temple tip part 12 provided with the battery 16 can be attached to and removed from the temple part 10. In FIG. 10B, a connection section CP4 to which a temple tip part 22 is connected is provided to the temple part 20, and the temple tip part 22 provided with a battery 26 can be attached to and removed from the temple part 20. In FIG. 10B, a circuit board 25 is provided to the temple part 20, and an optional function (e.g., sensor or TV tuner) can be implemented by the circuit board 25. For example, when the display device 50 is provided to the right temple part 10, and a TV tuner is provided to the left temple part 20, the user can watch a TV image by the TV tuner using the display device 50.

In FIG. 10B, the temple part 20 that is provided with the circuit board 25 can be replaced with a temple part 220 that is not provided with the circuit board 25. For example, when the user does not desire the above optional function, the user uses the eyeglass-type wearable device in a state in which the temple part 220 is connected instead of the temple part 20. In this case, the temple tip part 22 provided with the battery 26 can be connected to the temple part 220, and power supplied from the battery 26 can be supplied to the temple part 10 through the front part 30.

Figure 11B:
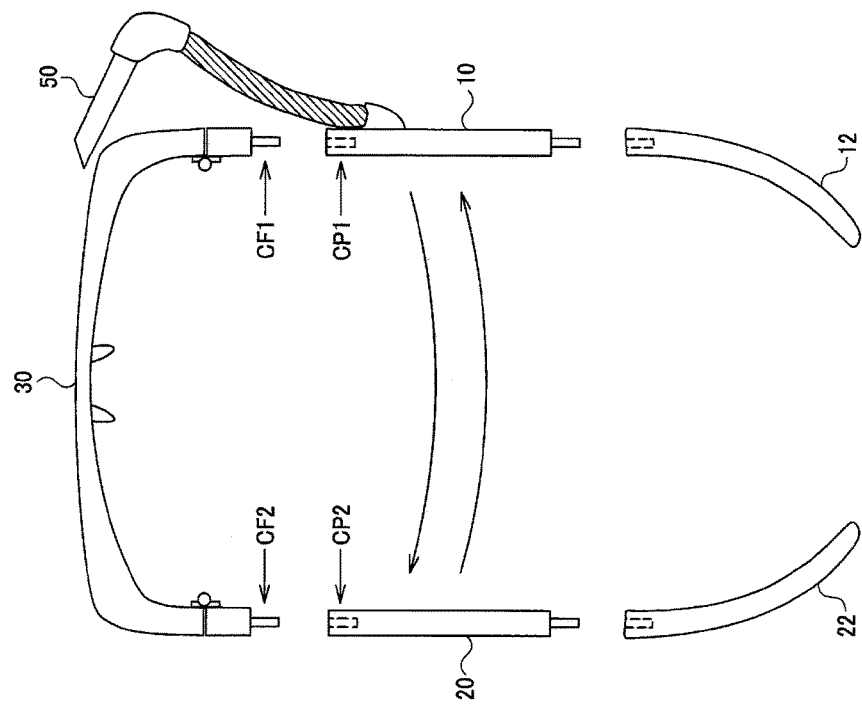
FIGS. 11A and 11B are views illustrating a method that interchanges a right temple part and a left temple part.
Figure 11A:
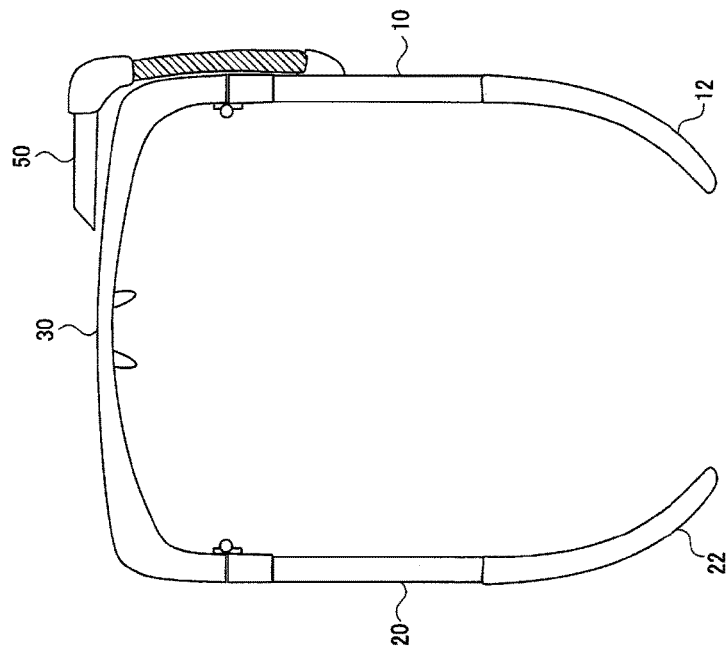

When the temple tip parts 12 and 22 can be attached to and removed from the temple parts 10 and 20 (see FIGS. 10A and 10B), the right temple part and the left temple part can be interchanged by interchanging the temple parts 10 and 20 (see FIGS. 11A and 11B). In this case, since it is unnecessary to interchange the temple tip parts 12 and 22, the temple tip parts 12 and 22 that fit the shape of the ears of the user can be used directly. Specifically, it is possible to interchange only the temple parts 10 and 20 without interchanging the temple tip parts 12 and 22 that fit the right and left ears of the user.

Figure 12:
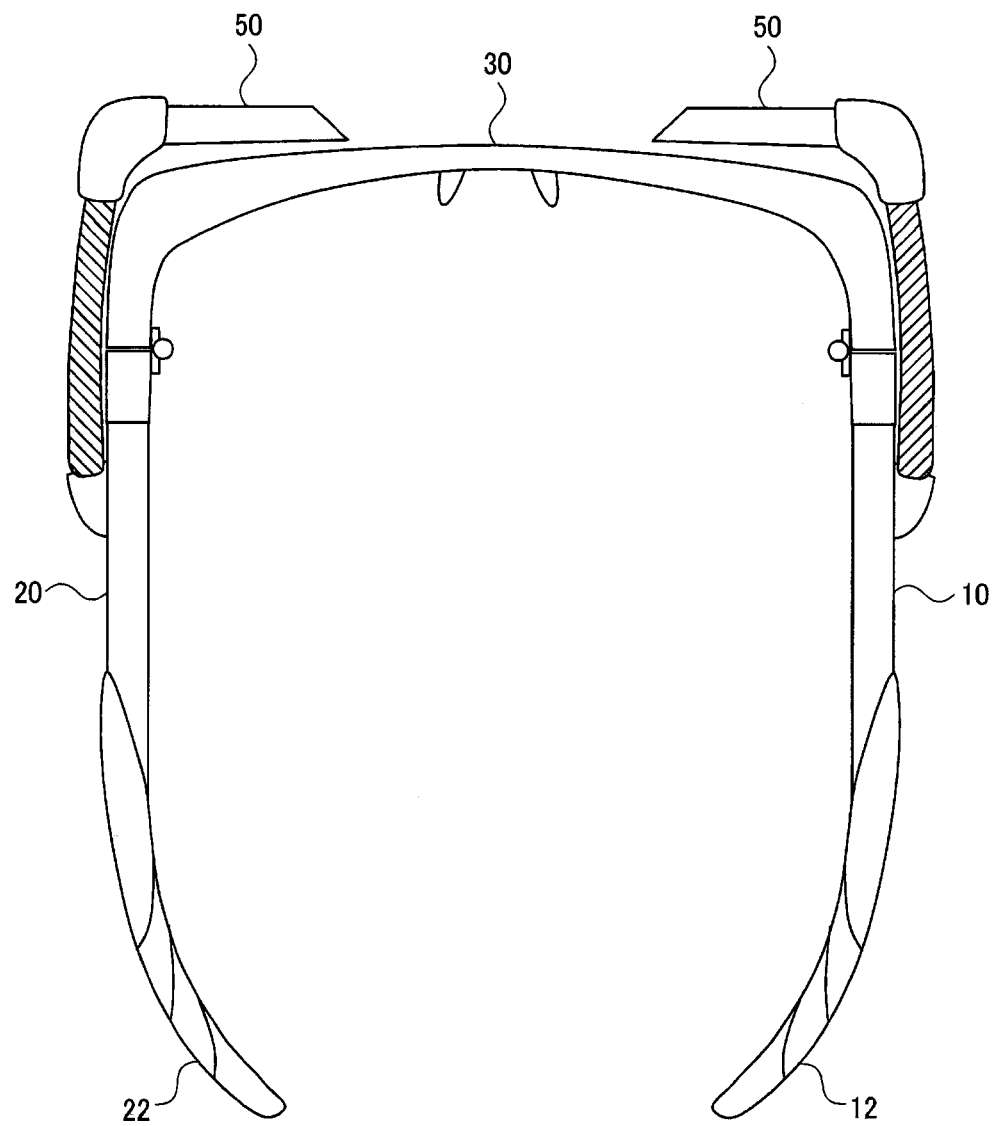
FIG. 12 illustrates an example in which temple parts provided with a display device are respectively connected to the right side and the left side of a front part.

FIG. 12 illustrates an example in which the temple parts 10 and 20 respectively provided with the display device 50 are connected to the right side and the left side of the front part 30. According to this configuration, an image as illustrated in FIG. 8B can be displayed in front of both the right eye and the left eye of the user. In this case, it is possible to deal with a wide variety of applications by changing the content of the image displayed in front of the left eye and the content of the image displayed in front of the right eye, for example.

Figure 13:
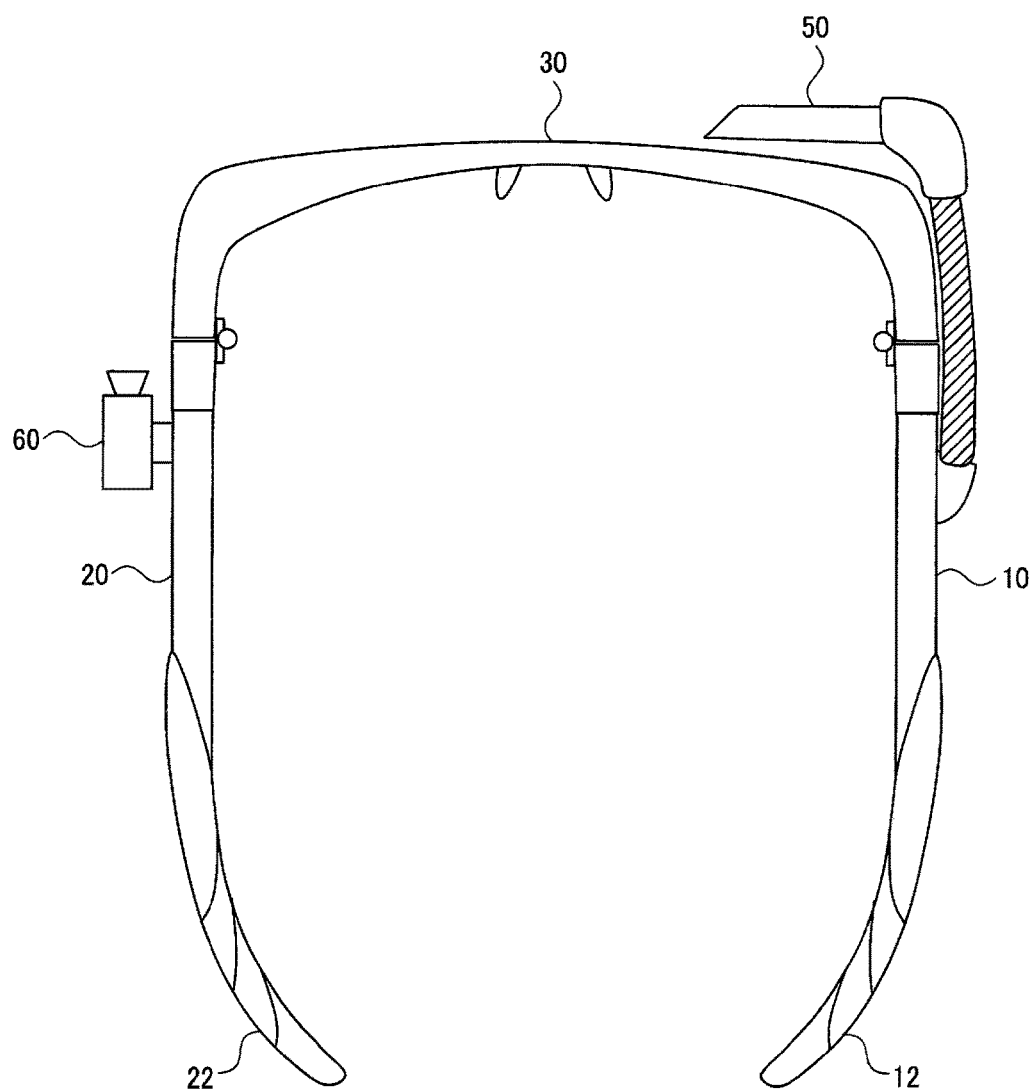
FIG. 13 illustrates an example in which a temple part provided with an imaging device and a temple part provided with a display device are respectively connected to the left side and the right side of a front part.

FIG. 13 illustrates an example in which the temple part 10 provided with the display device 50 is connected to the right side of the front part 30, and the temple part 20 provided with an imaging device 60 is connected to the left side of the front part 30. According to the configuration illustrated in FIG. 13, it is possible to provide a content while synchronizing the display device 50 and the imaging device 60. For example, it is possible to perform an image recognition process on the image captured by the imaging device 60, and display the image based on the results of the image recognition process on the display device 50. For example, a signboard or the like written in a foreign language may be captured using the imaging device 60, and subjected to the image recognition process, and the translation results obtained by the image recognition process may be displayed on the display device 50.

FIG. 14 illustrates an example in which the temple tip part 12 connected to the temple part 10 is replaced with a temple tip part 12-2 provided with an earphone. According to this configuration, it is possible to provide the user with a sound content through the temple tip part 12-2 provided with an earphone in addition to providing the user with an image content through the display device 50.

According to one embodiment of the invention, the electrical unit (display device, imaging device, and battery) of the eyeglass-type wearable device is provided to the temple part instead of the front part, and the temple part is removably connected to the front part. Therefore, the user can use the eyeglass-type wearable device as normal eyeglasses when the user does not utilize the wearable device by replacing the temple part, or use the eyeglass-type wearable device for a wide variety of applications by replacing the temple part with a temple part having a different function, for example.

For example, the front part of eyeglasses is normally required to have excellent design. However, when an electrical unit is provided to the front part, the size of the front part increases, and the design is impaired. When a heavy electrical unit is provided to the front part, the weight balance deteriorates, and convenience is impaired. For example, when displaying the see-through image illustrated in FIG. 8B, it is desirable to increase the time in which the user can comfortably use the eyeglass-type wearable device as much as possible. However, it is difficult to meet such a demand when a heavy electrical unit is provided to the front part.

According to one embodiment of the invention, since the temple part is designed to be removable from the front part, it is possible to use a front part having excellent design, and deal with the user demand for excellent design. It is also possible to use the eyeglass-type wearable device as normal eyeglasses by replacing the temple part with a normal eyeglass temple part that is not provided with an electrical unit (see FIG. 9C).

According to one embodiment of the invention, since the electrical unit is provided to the temple part, it is possible to reduce the weight and the size of the front part. This makes it possible to improve the weight balance of the eyeglass-type wearable device, and provide an eyeglass-type wearable device that displays the see-through image illustrated in FIG. 8B, and can be comfortably used for a long time, for example. In this case, the weight balance can be further improved by providing a battery in the temple tip part, or dividing the electrical unit between the right temple part and the left temple part.

Note that various structures may be employed for the connection sections of the front part and the temple part. For example, a connection section having the structure illustrated in FIGS. 15A and 15B may be employed.

Figure 15A:
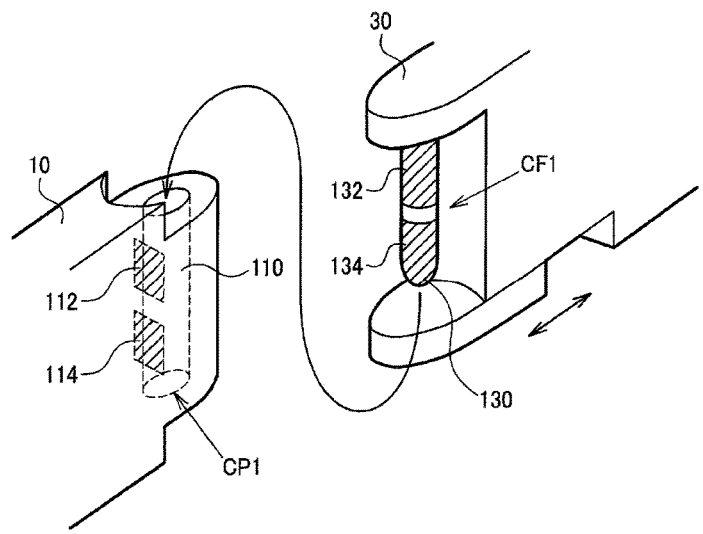
FIGS. 15A and 15B illustrate an example of the structure of a connection section.
Figure 15B:
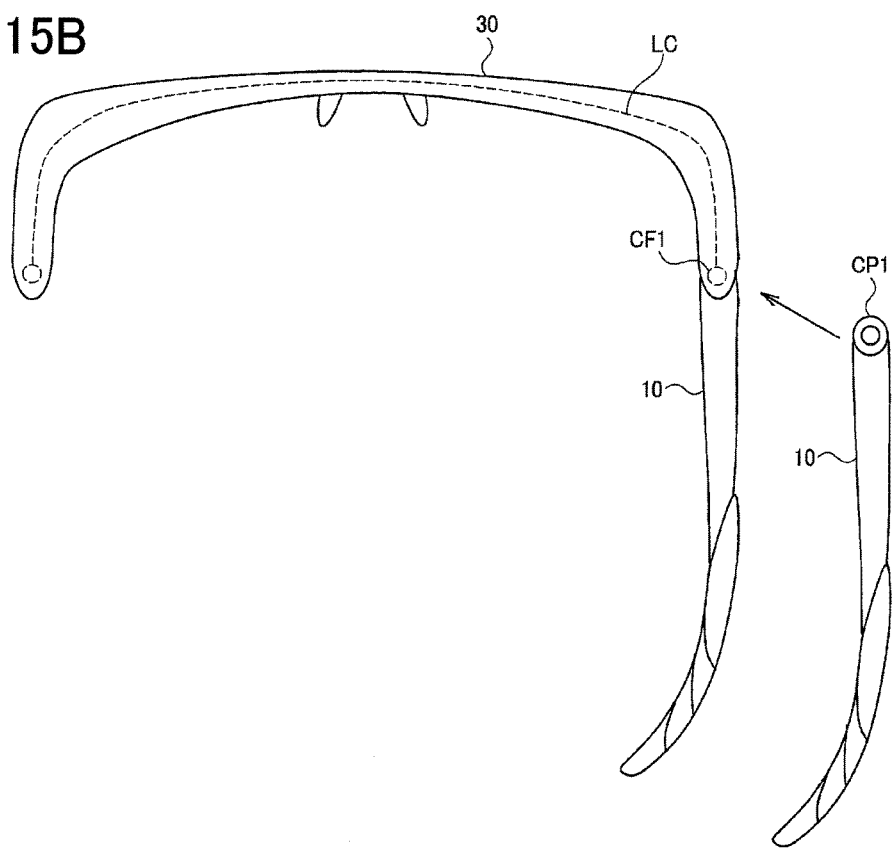

In FIG. 15A, the connection section CF1 of the front part 30 includes a pin jack 130, and electrodes 132 and 134 (terminals) provided to the pin jack 130. The connection section CP1 of the temple part 10 includes a receiving section 110 that receives the pin jack 130, and electrodes 112 and 114 (terminals) provided to the receiving section 110. As illustrated in FIG. 15B, the pin jack 130 is inserted into the receiving section 110 when connecting the front part 30 and the temple part 10. In this case, the electrodes 132 and 134 provided to the pin jack 130 come in contact with the electrodes 112 and 114 provided to the receiving section 110, and the front part 30 and the temple part 10 are electrically connected. Specifically, the electrical unit of the temple part 10 and the connection line LC of the front part 30 are electrically connected through connection between the electrodes 132 and 134 and the electrodes 112 and 114, and the electrical unit of the right temple part and the electrical unit of the left temple part are electrically connected.

Figure 16:
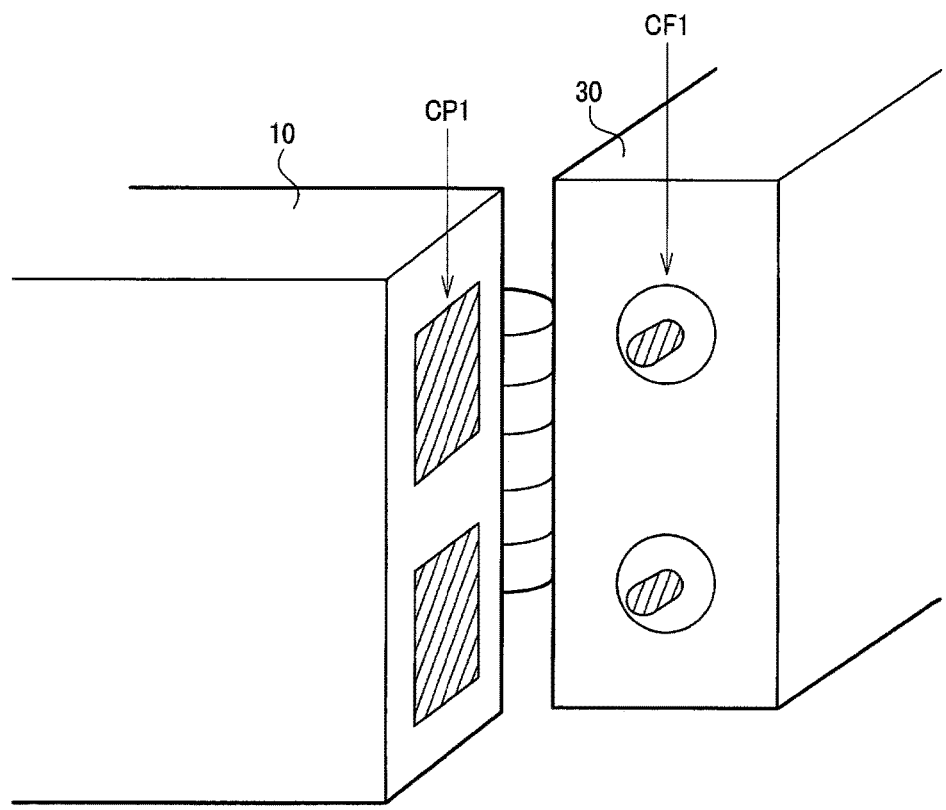
FIG. 16 illustrates another example of the structure of a connection section.

In FIG. 16, the front part 30 and the temple part 10 are connected via a hinge in the same manner as in normal eyeglasses. Each terminal of the connection section CF1 of the front part 30 is electrically connected to each terminal of the connection section CP1 of the temple part 10 during use.

FIGS. 17A to 18B illustrate an example in which a cover section that covers the terminals of the connection section is provided.

For example, a first cover section 41 illustrated in FIG. 17A covers the terminals (TF1, TF2) of the first connection section CF1 of the front part 30 when the first temple part 10 is not connected to the front part 30. A second cover section 42 illustrated in FIG. 17B covers the terminals (TF3, TF4) of the second connection section CF2 of the front part 30 when the second temple part 20 is not connected to the front part 30.

Figure 18A:
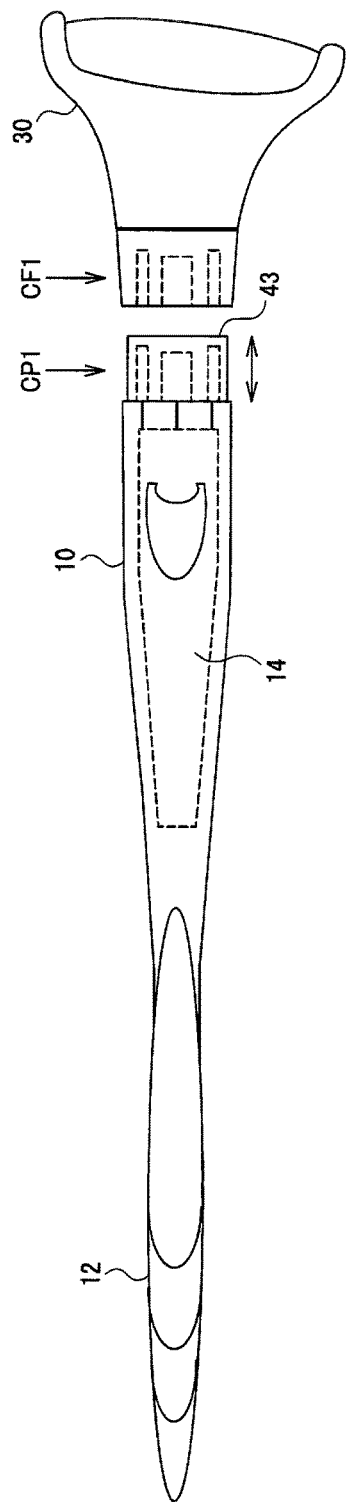
FIGS. 18A and 18B are views illustrating a method that provides a cover section to a connection section of a temple part.
Figure 18B:
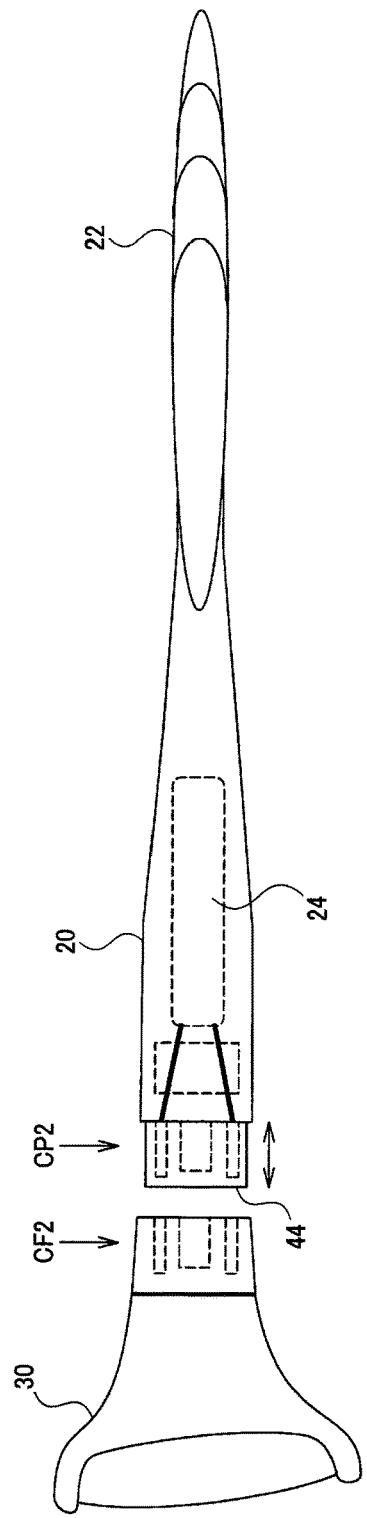

In FIGS. 18A and 18B, a cover section is provided to the temple part. Specifically, a first cover section 43 illustrated in FIG. 18A covers the terminals (TP1, TP2) of the first connection section CP1 of the temple part 10, and a second cover section 44 illustrated in FIG. 18B covers the terminals (TP3, TP4) of the second connection section CP2 of the temple part 20.

Specifically, since the temple part is designed to be removable from the front part, the terminals of the front part and the terminals of the temple part are exposed when the temple part is not connected to the front part. Therefore, electrical failure, a deterioration in waterproofness, and the like may occur.

Since the cover section that covers the terminals of the front part or the terminals of the temple part is provided in FIGS. 17A to 18B, it is possible to effectively prevent a situation in which the terminals are exposed when the temple part is not connected to the front part, whereby electrical failure, a deterioration in waterproofness, and the like occur. Therefore, it is possible to change or enhance the function by replacing the temple part while implementing suppression of electrical failure and an improvement in waterproofness.

As illustrated in FIGS. 17A to 18B, the cover sections 41 to 44 may be provided with a sliding mechanism, and may be slid into the front part 30 or the temple parts 10 and 20 when the temple parts 10 and 20 are connected to the front part 30. This makes it possible to prevent a situation in which the cover sections 41 to 44 hinder connection when the temple parts 10 and 20 are connected to the front part 30. Note that the cover sections 41 to 44 may be used as a waterproof member when the temple parts 10 and 20 are connected to the front part 30.

4. Detection of Type of Temple Part

Figure 19:
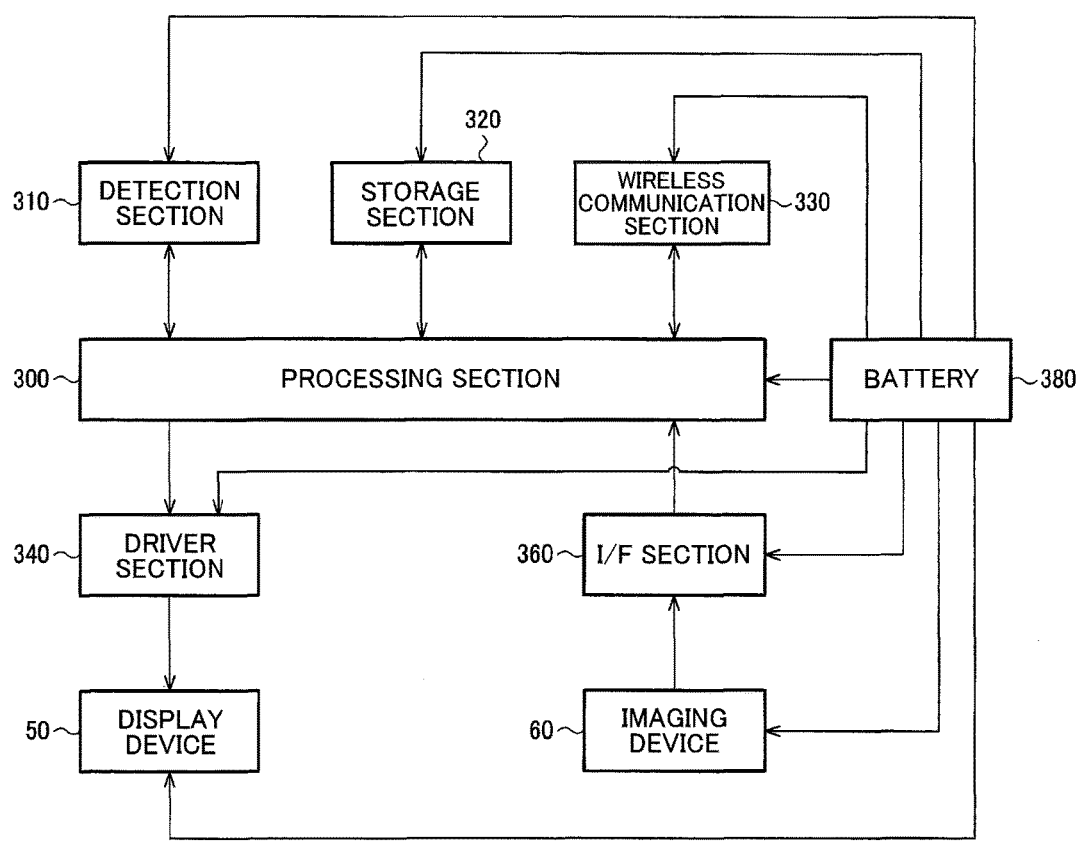
FIG. 19 is a block diagram illustrating the electrical configuration of an eyeglass-type wearable device.

FIG. 19 is a block diagram illustrating the electrical configuration of the eyeglass-type wearable device according to one embodiment of the invention (i.e., a functional block diagram illustrating the configuration of the electrical unit of the eyeglass-type wearable device).

In FIG. 19, a processing section 300 performs a device control process and a calculation process. The function of the processing section 300 may be implemented by a processor (e.g., microcomputer), an ASIC, or the like.

A detection section 310 performs a detection process. A storage section 320 is a memory that serves as a work area for the processing section 300 and the like, and stores image data. A wireless communication section 330 performs a wireless communication process that implements communication with the outside. A driver section 340 drives the display device 50. When the display section of the display device 50 is an LCD, the driver section 340 is implemented by a liquid crystal driver. An I/F section 360 serves as an interface with the imaging device 60. The I/F section 360 controls the imaging device 60, and performs an image capture process. An image sensor (e.g., CCD or CMOS sensor) may be used as the imaging device 60. A battery 380 supplies power to each section of the eyeglass-type wearable device. The battery 380 is implemented by a secondary battery, a primary battery, or the like.

In one embodiment of the invention, the detection section 310 detects the type of the temple part connected to the front part. For example, the detection section 310 detects the type of temple part connected to the right side or the left side of the front part. The processing section 300 performs a process based on the detection result of the detection section 310. Specifically, the processing section 300 performs various processes (e.g., image processing, control process, and determination process) corresponding to the temple part type detection result.

For example, the eyeglass-type wearable device according to one embodiment of the invention includes at least one of the display device 50 that displays an image to the user and the imaging device 60 that captures an image. For example, the display device 50 and/or the imaging device 60 are/is provided to the temple part. The processing section 300 performs image processing based on the detection result of the detection section 310 on the image displayed on the display device 50 or the image captured by the imaging device 60.

Figure 20A:
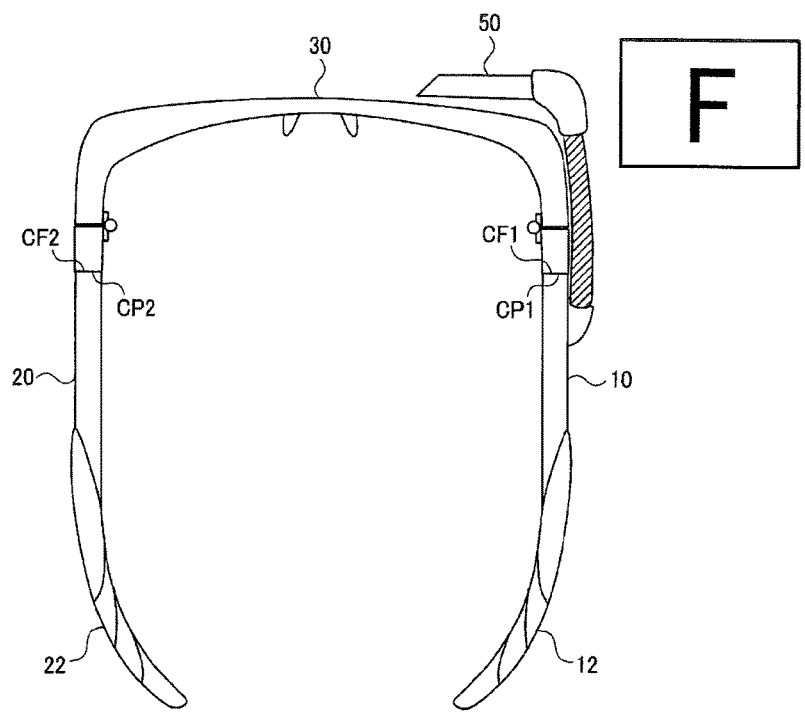
FIGS. 20A and 20B are views illustrating image processing based on a temple part type detection result.
Figure 20B:
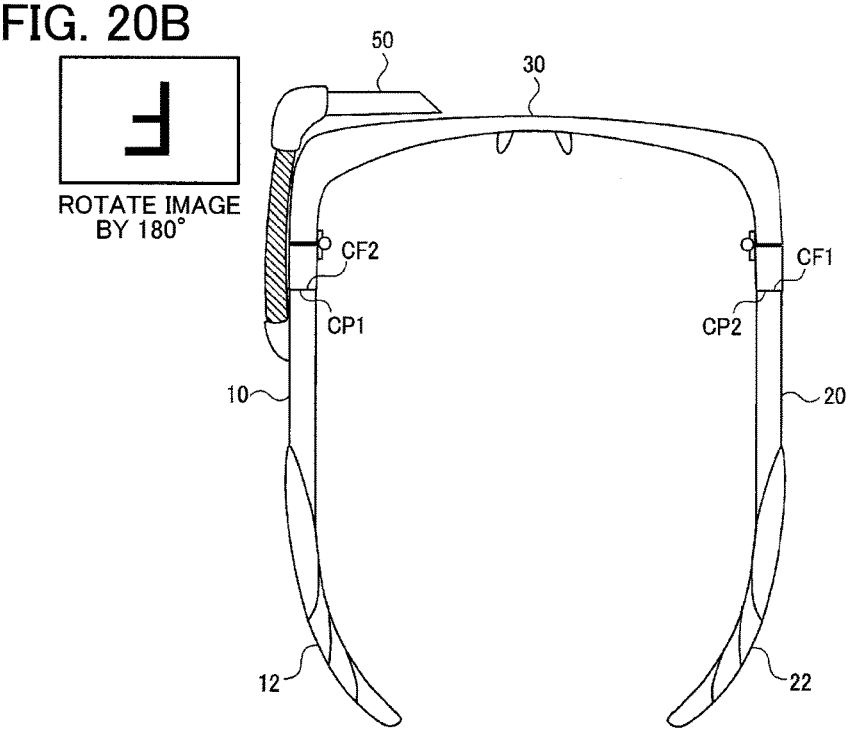

In FIGS. 20A and 20B, a process that rotates the image by 180° is performed as image processing. For example, the image is rotated by 180° around the center of the image. In FIG. 20A, the temple part 10 provided with the display device 50 is connected to the right side of the front part 30. In FIG. 20B, the temple part 10 provided with the display device 50 is connected to the left side of the front part 30. When the connection state is switched from the connection state illustrated in FIG. 20A to the connection state illustrated in FIG. 20B, the temple part 10 is rotated by 180°, and connected to the front part 30 (see above). Therefore, it is inconvenient for the user if the display device 50 displays an inverted image in the connection state illustrated in FIG. 20A and the connection state illustrated in FIG. 20B.

In order to deal with the above problem, the image displayed on the display device 50 is rotated by 180° when the connection state has been switched from the connection state illustrated in FIG. 20A to the connection state illustrated in FIG. 20B. Specifically, the detection section 310 detects that the connection state has been switched from the connection state illustrated in FIG. 20A to the connection state illustrated in FIG. 20B, and the processing section 300 performs image processing that rotates the display image by 180° based on the detection result. This makes it possible to display a consistent image to the user even when the connection state has been switched from the connection state illustrated in FIG. 20A to the connection state illustrated in FIG. 20B.

The above process is similarly performed when the connection state of the temple part provided with the imaging device has been switched, for example. In this case, the image captured by the imaging device is rotated by 180°.

Note that various processes may be performed as the process based on the temple part type detection result. For example, when the processing section 300 (microcomputer) is provided to the temple part 10, and an optional device (e.g., TV tuner or the sensor) is provided to the temple part 20, the processing section 300 performs various processes corresponding to the type of the temple part 20 based on the detection result for the type of the temple part 20 connected to the front part 30. For example, when the processing section 300 has determined that the temple part 20 provided with a TV tuner has been connected to the front part 30, the processing section 300 performs a process that displays an image obtained by the TV tuner on the display device 50. When the processing section 300 has determined that the temple part 20 provided with a sensor (e.g., GPS sensor or acceleration sensor) has been connected to the front part 30, the processing section 300 performs a process corresponding to the sensor. Specifically, when the processing section 300 has determined that the temple part 20 provided with a GPS sensor has been connected to the front part 30, the processing section 300 performs a positioning process that utilizes the GPS sensor. When the processing section 300 has determined that the temple part 20 provided with an acceleration sensor has been connected to the front part 30, the processing section 300 performs an application process (e.g., step count determination process, or operation information acquisition process that utilizes the acceleration sensor) that utilizes the acceleration sensor.

Specifically, one embodiment of the invention implements an eyeglass-type wearable device that can be changed or enhanced in function by making it possible to connect a temple part that is provided with various optional devices. The processing section 300 determines the function that is changed or enhanced by the temple part by detecting the type of the temple part, and performs a process corresponding to the type of the temple part. This makes it possible to efficiently change or enhance the function of the eyeglass-type wearable device by replacing the temple part.

The type of temple part may be detected in various ways. In FIG. 21A, the temple part 10 provided with a display device is connected to the right side of the front part 30, and the temple part 20 provided with a battery is connected to the left side of the front part 30. In this case, the power supply voltage VDD from the battery is supplied to the display device through the connection line LC1 of the front part 30 (see FIG. 6A).

In FIG. 21B, the temple part 10 provided with a display device is connected to the left side of the front part 30, and the temple part 20 provided with a battery is connected to the right side of the front part 30. In this case, the power supply voltage VDD from the battery is supplied to the display device through the connection line LC2 of the front part 30 (see FIG. 6B).

In FIGS. 21A and 21B, the detection section 310 detects the voltage of the connection lines LC1 and LC2, and the processing section 300 detects the types of the temple parts 10 and 20 connected to the front part 30 based on the voltage detection result.

In FIG. 21A, since the voltage of the connection line LC1 is detected to be the power supply voltage VDD, the processing section 300 can determine that the temple part 10 provided with a display device is connected to the right side of the front part 30, and the temple part 20 provided with a battery is connected to the left side of the front part 30. Therefore, the processing section 300 performs the control process so that the image illustrated in FIG. 20A is displayed on the display device.

In FIG. 21B, since the voltage of the connection line LC2 is detected to be the power supply voltage VDD, the processing section 300 can determine that the temple part 10 provided with a display device is connected to the left side of the front part 30, and the temple part 20 provided with a battery is connected to the right side of the front part 30. Therefore, the processing section 300 performs the control process so that the image illustrated in FIG. 20B is displayed on the display device. Specifically, the processing section 300 rotates the image displayed on the display device by 180°. This makes it possible to implement the process corresponding to the type of the connected temple part.

In FIG. 21C, processing sections 300-1 and 300-2 implemented by a microcomputer or the like are respectively provided to the temple parts 10 and 20. The processing sections 300-1 and 300-2 perform a communication process using a communication line LCM provided to the front part 30 (or perform a wireless communication process) to perform a temple part type determination process, for example. For example, the processing section 300-1 provided to the temple part 10 transmits type information about the temple part 10 to the processing section 300-2 through the communication line LCM. The processing section 300-2 provided to the temple part 20 transmits the type information about the temple part 20 to the processing section 300-1 through the communication line LCM. As illustrated in FIG. 21D, the process that should be performed by the processing sections 300-1 and 300-2 is linked to each temple ID (i.e., the type information about the temple part), and the processing sections 300-1 and 300-2 perform the process linked to each temple ID, for example. This makes it possible for the processing sections 300-1 and 300-2 to perform an appropriate process corresponding to the type of temple part.

When it has been determined based on the temple ID that the temple part 10 is a temple part provided with a display device, and the temple part 20 is a temple part provided with an imaging device, the processing sections 300-1 and 300-2 perform a process that displays the image captured by the imaging device provided to the temple part 20 on the display device provided to the temple part 10, for example. When it has been determined based on the temple ID that the temple part 10 is a temple part provided with an imaging device, and the temple part 20 is a temple part provided with a display device, the processing sections 300-1 and 300-2 perform a process that displays the image captured by the imaging device provided to the temple part 10 on the display device provided to the temple part 20, for example. This makes it possible to implement an appropriate process corresponding to the type of each temple part connected to the front part.

Although only some embodiments of the invention have been described in detail above, those skilled in the art would readily appreciate that many modifications are possible in the embodiments without materially departing from the novel teachings and advantages of the invention. Accordingly, all such modifications are intended to be included within scope of this invention. Any term cited with a different term having a broader meaning or the same meaning at least once in the specification and the drawings can be replaced by the different term in any place in the specification and the drawings. The configuration, processing, and the like of the eyeglass-type wearable device, the temple part, and the front part are not limited to those described in connection with the above embodiments. Various modifications and variations may be made.

What is claimed is:

1. An eyeglass-type wearable device comprising:
   a first temple part that is positioned along one temporal region of a user when the eyeglass-type wearable device is worn by the user;
   a second temple part that is positioned along the other temporal region of the user when the eyeglass-type wearable device is worn by the user; and
   a front part that is positioned in front of a face of the user when the eyeglass-type wearable device is worn by the user,
   the first temple part including a first electrical unit,
   the second temple part including a second electrical unit, the second electrical unit being a battery that supplies power to the first electrical unit, and
   the front part including:
      a first connection section to which the first temple part is connected;
      a second connection section to which the second temple part is connected;
      a first connection line electrically connecting the first electrical unit of the first temple part and the second electrical unit of the second temple part when the first temple part has been connected to the first connection section, and the second temple part has been connected to the second connection section, and
      a second connection line electrically connecting the first electrical unit of the first temple part and the second electrical unit of the second temple part when the second temple part has been connected to the first connection section, and the first temple part has been connected to the second connection section,
   the front part being configured such that:
      when the first temple part is connected to the first connection section and the second temple part is connected to the second connection section, the power from the battery of the second temple part is supplied to the first electrical unit of the first temple part through the first connection line,
      when the second temple part is connected to the first connection section and the first temple part is connected to the second connection section, the power from the battery of the second temple part is supplied to the first electrical unit of the first temple part through the second connection line, and when one second temple part having the battery is connected to the first connection section and an other second temple part having an other battery is connected to the second connection section, the battery of the one second temple part being connected to the first connection section is connected to the second connection line and the other battery of the other second temple part being connected to the second connection section is connected to the first connection line, so that the battery of the one second temple part and the other battery of the other second temple part are electronically disconnected, wherein the first electrical unit of the first temple part includes a display device and a driver that drives the display device, and the display device includes a display section; an eyepiece optical system that allows the user to observe an image displayed on the display section; and a support section that supports the eyepiece optical system in front of the front part.

2. The eyeglass-type wearable device as defined in claim 1, the first connection section of the front part being a connection section to which the second temple part can be connected instead of the first temple part, and the second connection section of the front part being a connection section to which the first temple part can be connected instead of the second temple part.

3. The eyeglass-type wearable device as defined in claim 2, the first temple part being connected to the first connection section in a state in which a first side faces in a first direction, and a second side opposite to the first side faces in a second direction that is opposite to the first direction, and connected to the second connection section in a state in which the first side faces in the second direction, and the second side faces in the first direction, and the second temple part being connected to the second connection section in a state in which a first side faces in the second direction, and a second side opposite to the first side faces in the first direction, and connected to the first connection section in a state in which the first side faces in the first direction, and the second side faces in the second direction.

4. The eyeglass-type wearable device as defined in claim 2, the first connection section including a first terminal and a second terminal, the second connection section including a third terminal and a fourth terminal, the first temple part including:
  a first temple-side terminal that is connected to the first terminal of the first connection section when the first temple part is connected to the first connection section, and connected to the fourth terminal of the second connection section when the first temple part is connected to the second connection section; and
  a second temple-side terminal that is connected to the second terminal of the first connection section when the first temple part is connected to the first connection section, and connected to the third terminal of the second connection section when the first temple part is connected to the second connection section, and the second temple part including:
  a third temple-side terminal that is connected to the third terminal of the second connection section when the second temple part is connected to the second connection section, and connected to the second terminal of the first connection section when the second temple part is connected to the first connection section; and
  a fourth temple-side terminal that is connected to the fourth terminal of the second connection section when the second temple part is connected to the second connection section, and connected to the first terminal of the first connection section when the second temple part is connected to the first connection section.

5. The eyeglass-type wearable device as defined in claim 2, when temple parts that are identical in type have respectively been connected to the first connection section and the second connection section, the front part electrically disconnecting electrical units respectively included in the temple parts that are identical in type.

6. The eyeglass-type wearable device as defined in claim 1, the first connection section of the front part including: a first terminal that is connected to the first connection line; and a second terminal that is connected to the second connection line, the second connection section of the front part including: a third terminal that is connected to the first connection line; and a fourth terminal that is connected to the second connection line, the first electrical unit of the first temple part and the second electrical unit of the second temple part being electrically connected through the first terminal of the first connection section, the first connection line, and the third terminal of the second connection section, when the first temple part has been connected to the first connection section, and the second temple part has been connected to the second connection section, and the second electrical unit of the second temple part and the first electrical unit of the first temple part being electrically connected through the second terminal of the first connection section, the second connection line, and the fourth terminal of the second connection section, when the second temple part has been connected to the first connection section, and the first temple part has been connected to the second connection section.

7. The eyeglass-type wearable device as defined in claim 6, the first electrical unit of the first temple part including an electrical part, power supplied from the battery included in the second temple part being supplied to the first electrical part included in the first temple part through the first terminal of the first connection section, the first connection line, and the third terminal of the second connection section, when the first temple part has been connected to the first connection section, and the second temple part has been connected to the second connection section, and power supplied from the battery included in the second temple part being supplied to the first electrical part included in the first temple part through the second terminal of the first connection section, the second connection line, and the fourth terminal of the second connection section, when the second temple part has been connected to the first connection section, and the first temple part has been connected to the second connection section.

8. The eyeglass-type wearable device as defined in claim 1, further comprising:
a detection section that detects a type of a temple part connected to the front part; and
a processing section that performs a process based on a detection result of the detection section.

9. The eyeglass-type wearable device as defined in claim 8, further comprising:
at least one of a display device that displays an image to the user and an imaging device that captures an image,
the processing section performing image processing based on the detection result of the detection section on the image displayed to the display device or the image captured by the imaging device.

\* \* \* \* \*